United States Patent
Sakaguchi et al.

(10) Patent No.: US 7,636,493 B2
(45) Date of Patent: Dec. 22, 2009

(54) FILTER DEVICE, FILTERING METHOD AND FILTERING PROGRAM PRODUCT

(75) Inventors: Satoshi Sakaguchi, Sakai (JP); Shinya Kadono, Nishinomiya (JP); Hideaki Shibata, Osaka (JP)

(73) Assignee: Panasonic Corporation, Osaka (JP)

( * ) Notice: Subject to any disclaimer, the term of this patent is extended or adjusted under 35 U.S.C. 154(b) by 632 days.

(21) Appl. No.: 10/925,991

(22) Filed: Aug. 26, 2004

(65) Prior Publication Data

US 2005/0047673 A1 Mar. 3, 2005

(30) Foreign Application Priority Data

Aug. 27, 2003 (JP) ............................. 2003-302554

(51) Int. Cl.
*G06K 9/40* (2006.01)
(52) U.S. Cl. .................... 382/274; 382/261; 382/271
(58) Field of Classification Search ................ 382/274, 382/261, 264
See application file for complete search history.

(56) References Cited

U.S. PATENT DOCUMENTS 6,002,447 A * 12/1999 Rumreich et al. ........... 348/606
6,172,770 B1 * 1/2001 Inoue ......................... 358/3.06
6,272,260 B1 * 8/2001 Furukawa et al. ........... 382/261
6,415,065 B1 * 7/2002 Miyake ....................... 382/300
6,493,467 B1 * 12/2002 Okuda et al. ................ 382/260

OTHER PUBLICATIONS

International Standard ISO/IEC 14496-2, Information Technology—Coding of Audio-Visual Object Part 2: Visual Second Edition, Dec. 1, 2001, pp. 448-452.

* cited by examiner

*Primary Examiner*—Charles Kim
*Assistant Examiner*—Stephen R Koziol
(74) *Attorney, Agent, or Firm*—Wenderoth, Lind & Ponack, L.L.P.

(57) ABSTRACT

A filter device includes a vertical NR process portion, a vertical resolution conversion portion and a vertical NR process decision portion. The vertical NR process portion receives a horizontal NR processed signal and produces an NR processed signal. The vertical resolution conversion portion includes a plurality of resolution conversion filters and uses the NR processed signal to perform a vertical resolution conversion. The vertical NR process decision portion decides whether or not the vertical NR process portion should perform the vertical NR process on the horizontal NR processed signal in accordance with a resolution conversion filter selection signal for selecting one of plurality of resolution conversion filters for the vertical resolution conversion portion.

2 Claims, 25 Drawing Sheets

Fig.3

| resolution conversion filter selection signal | 0 | 1 | 2 |
|---|---|---|---|
| decision result value | 0 | 1 | 0 |

(b) → 0, (a) → 1, (b) → 2 operation of vertical NR filter

| decision result value | operation |
|---|---|
| 0 | vertical NR filter ON |
| 1 | vertical NR filter OFF (through) |

Y'(y) = Y(y) in the state of through operation of vertical resolution conversion filter

| resolution conversion filter selection signal | operation |
|---|---|
| 0 | no resolution conversion (Y''(y) = Y'(y)) |
| 1 | six line input and one line output |
| 2 | middle four line input and one line output |

Fig.6

| candidate filter | filter tap number | filter threshold level | filter and threshold level condition |
|---|---|---|---|
| FH₁ | FH₁tap | TH₁ | |
| FH₂ | FH₂tap | TH₂ | |
| FH₃ | FH₃tap | TH₃ | |
| ... | ... | ... | |

$FH_1 tap \geq FH_2 tap \geq FH_3 tap \geq \cdots$ ... (FHktap decreases monotonously along with k)

$TH_1 \leq TH_2 \leq TH_3 \leq \cdots$ ... (THk increases monotonously along with k)

decision of using filter FHk pixel value: Y(x), diff(x) at positions x-3, x-2, x-1, x, x+1, x+2, x+3 filter application pixel : ▨ pixel referred by candidate filter k : ▨ + □ local image characterizing quantity : $DIFF(x) = diff(Y(x), Y(x+1))$ ... F31 comparison function : $CMP_k(x) = cmp(TH_k, DIFF(x))$ ... F32 constant parameter : $TH_k, TH\_d_k$ filter application condition:

$DECISION_k(x)$
$= decision_k(TH\_d_k, CMP_k(x\text{-}FH_ktap/2), CMP_k(x\text{-}FH_ktap/2+1), \cdots, CMP_k(x+FH_ktap/2-1)))$ ... F30

If the DECISIONk(x) is 1, filter FHk is used for the filter application pixel x.

Fig.7

| candidate filter FHk | filter factor | threshold level THk |
|---|---|---|
| FH1 | [1,1,1,2,1,1,1] | 8 |
| FH2 | [1,1,4,1,1] | 16 |
| FH3 | [2,4,2] | 32 |

Fig.10

| candidate filter FHk | filter factor | threshold level THk |
|---|---|---|
| FH1 | [3,2,3] | 8 |
| FH2 | [2,4,2] | 16 |
| FH3 | [1,6,1] | 32 |

Fig.14

| candidate filter | filter factor | appliable position of pixel |
|---|---|---|
| FH1 | [1,2,2,2,1] | pixel adjacent to block boundary |
| FH2 | [1,1,4,1,1] | every pixel |
| FH3 | [2,4,2] | except for pixel adjacent to block boundary |

*1 If the filter application condition concerning a position of the filter application pixel (e.g., whether or not the filter is used for a pixel on a block boundary) is different between FHk and FHk+1, the relationship between Fk+1, THk+1 and Fk, THk is irrespective.

filter application condition:

DECISION(y)
= decision(*TH_d*,CMP(y-1),CMP(y))) · · · F1

If the DECISION(y) is 1, filter is used for the
filter application pixel y (filter factor:[1,2,1]).

filter application pixel :  ▨
filter refference pixel :  ▨ + □
local image
characterizing quantity : DIFF(y) = diff(Y(y),Y(y+1)) · · · F2
comparison function : CMP(y) = cmp(*TH*,DIFF(y)) · · · F3
constant parameter : *TH,TH_d*

Fig.24 operation of vertical resolution conversion filter

| resolution conversion filter selection signal | operation |
|---|---|
| 0 | no resolution conversion (Y''(y) = Y'(y)) |
| 1 | six line input and one line output |
| 2 | middle four line input and one line output |

Fig.25

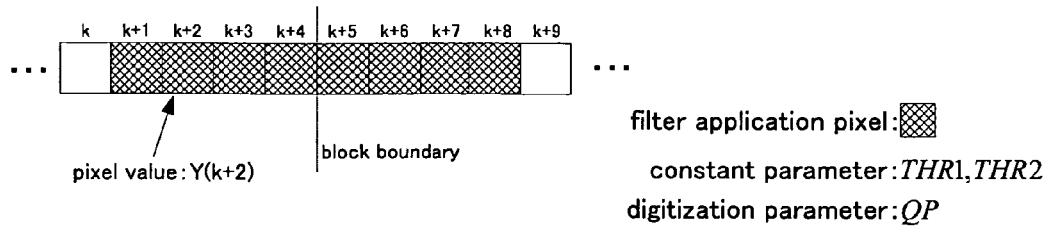

filter application pixel: ▨
constant parameter: $THR1, THR2$
digitization parameter: $QP$ $$eq\_cnt = \sum_{i=k}^{k+8} \phi(Y(k) - Y(k+1)) \quad \cdots F5$$

$$\phi(\gamma) = \begin{cases} 1 : if \ |\gamma| \leq THR1 \\ 0 : otherwise \end{cases} \quad \cdots F6$$

If $(eq\_cnt \geq THR2)$

In case $|Y_{max} - Y_{min}| < 2 \cdot QP \quad \cdots F10$ where $Y_{max} = \max_{1 \leq i \leq 8}(Y(k+i))$
$Y_{min} = \min_{1 \leq i \leq 8}(Y(k+i))$ pixel value Y' after filtering process is $$\boxed{Y'(k+i) = \sum_{j=-4}^{4} b_j \cdot p(k, i+j), \quad 1 \leq i \leq 8} \quad \cdots F11$$

where $$p(k,l) = \begin{cases} (|(Y(k) - Y(k+1)| < QP)? \ Y(k) : Y(k+1), & if \ i = 1 \\ Y(k+l), & if \ 1 < i < 8 \\ (|(Y(k+8) - Y(k+9)| < QP)? \ Y(k+9) : Y(k+8), & if \ i = 8 \end{cases}$$

$\cdots F12$ $\{b_k : -4 \leq k \leq 4\} = \{1,1,2,2,4,2,2,1,1\} // 16 \quad \cdots F13$ If $(eq\_cnt < THR2)$ pixel value Y' after filtering process $$\boxed{\begin{aligned} Y'(k+4) &= Y(k+4) - d \\ Y'(k+5) &= Y(k+5) + d \\ Y'(k+i) &= Y(k+i), \quad 1 \leq i \leq 8 \end{aligned}} \quad \cdots F15$$

where $d = \text{CLIP}(5 \cdot (a_{3,0}' - a_{3,0}) // 8, 0, (Y'(k+4) - Y'(k+5))/2) \cdot \delta(|a_{3,0}| < QP) \quad \cdots F16$ $a_{3,0}' = \text{sign}(a_{3,0}) \cdot \min(|a_{3,0}|, |a_{3,1}|, |a_{3,2}|) \quad \cdots F17$ $$\begin{cases} a_{3,0} = ([2 \ -5 \ 5 \ -2] \bullet [Y(k+3) \ Y(k+4) \ Y(k+5) \ Y(k+6)]^T // 8 \\ a_{3,1} = ([2 \ -5 \ 5 \ -2] \bullet [Y(k+1) \ Y(k+2) \ Y(k+3) \ Y(k+4)]^T // 8 \quad \cdots F18 \\ a_{3,2} = ([2 \ -5 \ 5 \ -2] \bullet [Y(k+5) \ Y(k+6) \ Y(k+7) \ Y(k+8)]^T // 8 \end{cases}$$

$\text{CLIP}(x, a, b) = \max(a, \min(b, x)) \quad \cdots F19$

FILTER DEVICE, FILTERING METHOD AND FILTERING PROGRAM PRODUCT

BACKGROUND OF THE INVENTION

1. Field of the Invention

The present invention relates to a filter device, and more specifically to a filter device using a noise reduction (NR) filter. The present invention also relates to a filtering method and a filtering program product using an NR filter.

2. Description of the Prior Art

Some electronic devices, including DVD recorders that handle a coded image signal, use a noise reduction (NR) filter for reducing block noise or mosquito noise so as to improve image quality. An NR filter that is used in a circuit after decoding a coded image signal is particularly called a postfilter.

(Filter Device 400)

FIG. 21 shows a block diagram of a filter device 400 for performing a noise reduction (NR) process.

The filter device 400 includes a postfilter portion 300 that performs a horizontal and a vertical NR process on a decoded image signal 310 so as to produce an NR processed signal 312, and a vertical resolution conversion portion 303 that performs a vertical resolution conversion of the NR processed signal 312 so as to produce a display image signal 313.

(Postfilter Portion 300)

The postfilter portion 300 includes a horizontal NR process portion 301 that receives the decoded image signal 310 and produces a horizontal NR processed signal 311, and a vertical NR process portion 302 that receives the horizontal NR processed signal 311 and produces the NR processed signal 312.

The horizontal NR process portion 301 that performs the horizontal NR process on the decoded image signal 310 includes a condition decision portion 304 and a horizontal NR process execution portion 305. The condition decision portion 304 decides the application conditions as to whether or not to apply the horizontal NR filter to the decoded image signal 310 in accordance with a previously set threshold level 315. The horizontal NR process execution portion 305 performs the horizontal NR process on the decoded image signal 310 in accordance with the decoded image signal 310 and the result of the decision 318 by the condition decision portion 304 so as to produce the horizontal NR processed signal 311.

The vertical NR process portion 302 that performs the vertical NR process on the horizontal NR processed signal 311 includes a condition decision portion 306 and a vertical NR process execution portion 307. The condition decision portion 306 decides whether or not to apply the vertical NR filter to the horizontal NR processed signal 311 in accordance with a previously set threshold level 316. The vertical NR process execution portion 307 performs the vertical NR process on the horizontal NR processed signal 311 in accordance with the horizontal NR processed signal 311 and the result of the decision 319 by the condition decision portion 306 so as to produce the NR processed signal 312.

FIG. 22 shows a block diagram for explaining the structure of a vertical NR filter portion that is used in the vertical NR process portion 302. The vertical NR process portion 302 includes six vertical NR filter portions 321-326, each of which has the number of filter taps [3]. The vertical NR filter portions 321-326 are supplied with the horizontal NR processed signal 311. More specifically, pixel values Y(y−3) to Y(y+4) of eight lines at the same horizontal position of the horizontal NR processed signal 311 enter the vertical NR filter portions 321-326 in groups of three lines.

Each of the vertical NR filter portions 321-326 decides whether or not the vertical NR filter should be used for the horizontal NR processed signal 311 in accordance with the input pixel values Y(y−3) to Y(y+4) and the set threshold level 316 so as to produce the NR processed signal 312. The NR processed signal 312 is produced as pixel values Y'(y−2) to Y'(y+3) by the vertical NR filter portions 321-326. Namely, each of the vertical NR filter portions 321-326 works as the condition decision portion 306 and the vertical NR process execution portion 307.

The decision whether or not the filter is to be applied in each of the vertical NR filter portions 321-326 will be described with reference to FIG. 23. For example, the vertical NR filter portion 323 includes a vertical NR filter having the number of filter taps [3] for using three pixels "y−1", "y" and "y+1" for a filter application pixel "y" having a pixel value Y(y). Whether the vertical NR filter should be used or not for the filter application pixel "y" in the vertical NR filter portion 323 is decided by using the filter application condition F1. If a value of the filter application condition F1 is [1], a filter having filter factor [1,2,1] is applied to pixels "y−1", "y" and "y+1" so as to produce a pixel value Y' (y). Note that CMP(y) is a comparison function defined by the equation F3 in the filter application condition F1. Furthermore, TH in the equation F3 means the threshold level 316.

The basic operation is similar with respect to other vertical NR filter portions 321, 322 and 324-326. In addition, the basic operation is also similar with respect to the horizontal NR filter portion in the horizontal NR process portion 301.

(Vertical Resolution Conversion Portion 303)

The NR processed signal 312 produced by the postfilter portion 300 (see FIG. 21) is received by the vertical resolution conversion portion 303. The received NR processed signal 312 is processed by the vertical resolution conversion filter for vertical resolution conversion and the display image signal 313 is produced. The vertical resolution conversion portion 303 includes a plurality of vertical resolution conversion filters that are applied in accordance with a conversion ratio for the vertical resolution. The plural vertical resolution conversion filters are selected in accordance with a resolution conversion filter selection signal 317.

With reference to FIG. 24, three resolution conversion filters of the vertical resolution conversion portion 303 will be described. The vertical resolution conversion portion 303 selects a resolution conversion filter in accordance with three values [0], [1] and [2] designated by the resolution conversion filter selection signal 317. If the value [0] is designated for example, the resolution conversion of the NR processed signal 312 is not performed, and a pixel value Y"(y) for Y"(y)= Y'(y) is generated as the display image signal 313. If the value [1] is designated, a pixel value Y"(y) that is derived from six pixel values Y'(y−2) to Y'(y+3) of the NR processed signal 312 are produced. Here, the value [1] is designated for example, when the conversion of the vertical resolution is not a conversion with a simple conversion ratio such as an integer or an inverse number of an integer. If the value [2] is designated, a pixel value Y"(y) derived from four pixel values Y'(y−1) to Y'(y+2) of the NR processed signal 312 is generated. Here, the value [2] is designated for example, when the conversion of the vertical resolution is a conversion with a simple conversion ratio such as an integer or an inverse number of an integer.

(Block NR Filter)

On the other hand, there is a technique known in which one of a plurality filters are switched and used for the purpose of improving the noise reduction effect, especially for the purpose of reducing block noise (see ISO/IEC, 14496-2: 2001

(E), "Information Technology—Coding of Audio-Visual Objects—Part 2: Visual", Second Edition, Dec. 1, 2001, pp. 448-450, for example).

With reference to FIG. 25, a deblock filter for reducing block noise that is disclosed in the above-mentioned document will be described. The deblock filter disclosed in the above-mentioned document calculates filtered pixel values Y'(k+1) to Y'(k+8) for eight pixels "k+1" to "k+8" (whose pixel values are Y(k+1)–Y(k+8)) including block boundaries of 8×8 pixels of an image block (for example, a coded block) that is a unit of process of an image signal. More specifically, differences between neighboring pixels are calculated for the pixels "k+1" to "k+8", so as to switch the filter by condition decision using the difference between neighboring pixels. Here, the condition decision is performed in accordance with the equation F5. Note that $\phi(\gamma)$ is a comparison function defined by the equation F6 in the equation F5. Namely, it is decided whether an absolute value of the difference between neighboring pixels is smaller than or equal to the threshold level THR1 in the equation F6.

If the value eq_cnt of the equation F5 is more than or equal to threshold level THR2 and the equation F10 has a true value, the pixel values Y'(k+1) to Y'(k+8) after the filtering become values calculated by the equation F11. Here, Ymax and Ymin in the equation F10 are the maximum value and the minimum value of the pixel values Y(k+1) to Y(k+8), respectively. In addition, QP is a digitization parameter. Furthermore, p(k, i+j) and bj in the equation F11 are defined by the equations F12 and F13. Here, in the equation F13, "//" represents a division operation in which the fractional portion is rounded. Note that "/" in the equation represents a division operation in which the fractional portion is dropped off(similar hereinafter).

On the other hand, if a value eq_cnt of the equation F5 is less than the threshold level THR2, the pixel values Y'(k+1) to Y'(k+8) after the filtering become values calculated by the equation F15. Here, "d" in the equation F15 becomes a value calculated by the equation F16. In addition, a3,0' in the equation F16 has a value decided in accordance with the equation F17 and the equation F18, while CLIP( ) is a function defined by the equation F19.

Concerning the above-described filter device, it is desirable to reduce hardware costs and to reduce the process load of the filtering process.

In particular, it is desirable to reduce hardware costs when performing the vertical NR process with hardware. When using a plurality of NR filters that are switched in order to obtain a sufficient noise reduction effect, it is desirable to simplify the hardware structure or to simplify the processes by means of software.

SUMMARY OF THE INVENTION

An object of the present invention is to provide a filter device, a filtering method and a filtering program that can reduce hardware costs or software process loads.

A filter device according to a first aspect of the present invention includes an NR process unit, a resolution conversion unit and an NR process decision unit. The NR process unit receives an input image signal and generates an output image signal from the input image signal. The resolution conversion unit has a plurality of resolution conversion filters and performs resolution conversion by using the output image signal. The NR process decision unit decides whether or not the NR process unit should perform an NR process on the input image signal in accordance with a resolution conversion filter selection signal for selecting one of the plurality of resolution conversion filters for the resolution conversion unit.

The NR process is hereinafter defined as, for example, a smoothing process or the like in which a pixel in the input image signal that is to be subject to the NR process is smoothed with respect to other pixels of the input image signal (the adjoining pixels in the vertical, horizontal, and other directions). In addition, the resolution conversion filter selection signal is hereinafter defined as, for example, a signal that is supplied in accordance with a resolution conversion ratio necessary for an image size of the input image signal and a display size of the output image signal. The plurality of resolution conversion filters are hereinafter defined to include, for example, a filter that is not for resolution conversion and a resolution conversion filter for producing one pixel for a display by using a plurality of pixels of the output image signal.

The filter device according to the present invention does not need a unit for performing the NR process on an output image signal, which is always used in a state where the NR process is not performed among output image signals used by the resolution conversion filter. Therefore, hardware costs can be reduced.

According to the filter device of a second aspect of the present invention, the NR process decision unit decides not to perform the NR process if the resolution conversion filter selection signal selects a complicated resolution conversion filter.

The complicated resolution conversion filter means, for example, a filter that uses many pixels in the output image signal, or a filter whose conversion ratio is not as simple as an integer or an inverse number of an integer. The complicated resolution conversion filter is usually selected when there is little input image signal noise such as a period for playing DVD contents, for example. Therefore, good image quality can be maintained even if the NR process is not performed on the input image signal.

A filter device according to the present invention can maintain good image quality and enables reduction of hardware costs.

According to the filter device of a third aspect of the present invention, the NR process unit performs the NR process by using the same number of pixels of the input image signal as the maximum number of pixels of the output image signal that are used by the plurality of resolution conversion filters.

Conventionally, every output image signal is a signal after the NR process. Therefore, the number of pixels of the input image signal that are used for obtaining the output image signal is larger than the maximum number of pixels of the output image signal that are used by the plurality of resolution conversion filters.

According to the filter device of the present invention, a portion of the output image signal is always the same as the input image signal. Therefore, it is possible to reduce the number of pixels of the input image signal that are used in order to obtain an output image signal having the same number of pixels as is conventional. Namely, it is possible to reduce the number of memories for supplying input image signals necessary for the NR process and the number of signal lines for obtaining image signals from the memories.

According to the filter device of a fourth aspect of the present invention, the NR process unit has smaller number of NR filter units than the maximum number of pixels of the output image signal that are used by the plurality of resolution conversion filters.

Here, the NR filter unit may be a filter that performs the NR process on the input image signal by one NR filter or by switching among a plurality of NR filters, for example.

Conventionally, every output image signal is a NR processed signal. Therefore, the number of NR filters that are used for obtaining the output image signal is the same as the maximum number of pixels of the output image signal used by the plurality of resolution conversion filters.

According to the filter device of the present invention, a portion of the output image signal is always the same as the input image signal. Therefore, it is possible to reduce the number of NR filters that are used in order to obtain the same number of output image signals as in conventional filtering methods or devices.

According to the filter device of a fifth aspect of the present invention, the NR process unit performs the NR process on the input image signal in the vertical direction, and the resolution conversion unit performs the resolution conversion of the output image signal in the vertical direction.

The filter device of the present invention does not need a unit for performing the NR process on an output image signal that is always used in a state where the vertical NR process is not performed among output image signals that are used by the resolution conversion filter. Therefore, hardware costs can be reduced. For example, it is possible to reduce the number of line memories for supplying input image signals necessary for the NR process and the number of signal lines for obtaining image signals from the line memories.

A filtering method according to a sixth aspect of the present invention is for producing an output image signal from an input image signal. The filtering method includes an NR process decision step and an NR process step. The NR process decision step is for deciding whether or not to perform an NR process on the input image signal in accordance with a resolution conversion filter selection signal for selecting one of the plurality of resolution conversion filters for performing resolution conversion of the output image signal. The NR process step is for performing an NR process on the input image signal in accordance with a decision result in the NR process decision step.

The filter method according to the present invention does not need a unit for performing the NR process on an output image signal that is always used in a state where the NR process is not performed among output image signals that are used by the resolution conversion filter, so that hardware costs can be reduced. In addition, if the filtering method is performed by software, the software process load can be reduced.

A filtering program product according to a seventh aspect of the present invention is for use in a computer that performs a filtering method for producing an output image signal from an input image signal. The filtering program product includes an NR process decision step for deciding whether or not to perform an NR process on the input image signal in accordance with a resolution conversion filter selection signal for selecting one of the plurality of resolution conversion filters for performing resolution conversion of the output image signal, and an NR process step for performing an NR process on the input image signal in accordance with a decision result by the NR process decision step.

The filtering program product according to the present invention does not need a step for performing the NR process on an output image signal that is always used in a state where the NR process is not performed, amongst the output image signals that are used by the resolution conversion filter, so the software process load can be reduced.

A filter device according to an eighth aspect of the present invention includes an NR process performing unit and an NR filter selection unit. The NR process performing unit has a plurality of NR filters. The NR filter selection unit derives an image characterizing quantity by using pixels in a range determined to correspond to a reference pixel range that is used by the plurality of NR filters, and selects one of the plurality of NR filters of the NR process performing unit in accordance with each image characterizing quantity and a threshold level of the image characterizing quantity that is set for each of the plurality of NR filters.

The image characterizing quantity has a value that is determined in accordance with a pixel value of a neighboring pixel in the vertical or the horizontal direction. More specifically, it has a value determined in accordance with a difference between neighboring pixels. Still more specifically, the value is derived by calculating an absolute value of the difference between neighboring pixels or a square value of the difference between neighboring pixels, for example.

According to the filter device of the present invention, it is possible to use a common method of deriving the image characterizing quantity for selecting the NR filter. Thus, the process for selecting the NR filter can be simplified. Namely, hardware costs for performing the process of selecting the NR filter can be reduced.

According to the filter device of a ninth aspect of the present invention, each image characterizing quantity is derived by using pixels in the reference pixel range.

According to the filter device of the present invention, it is possible to use common pixels that are necessary for deriving the image characterizing quantity and are used by each of the plurality of NR filters. Therefore, hardware for storing or obtaining these pixels can be commonly used.

According to the filter device of a tenth aspect of the present invention, a scale of the reference pixel range for each of the plurality of NR filters increases monotonously along with filter intensity, and the threshold level set for each of the plurality of NR filters is decided so that the NR filter having larger filter intensity does not tend to be selected by the NR filter selection unit.

Here, the filter intensity means a degree of noise reduction, and pixels become smoother by using a filter having a larger filter intensity.

According to the filter device of the present invention, it is possible to use a filter having a larger filter intensity as the smoothness of the image increases. Therefore, an appropriate NR effect can be obtained.

According to the filter device of an eleventh aspect of the present invention, the NR filter selection unit gives higher priority to an NR filter having a larger reference pixel range or an NR filter having larger filter intensity in selecting one of the plurality of NR filters.

According to the filter device of the present invention, it is possible to use a filter having higher NR effect with a higher priority.

According to the filter device of a twelfth aspect of the present invention, the plurality of NR filters have the same sum of filter factors.

According to the filter device of the present invention, it is possible to use a common dividing process after adopting the filter factors of the plurality of NR filters. Therefore, hardware can be structured more simply.

According to the filter device of a thirteenth aspect of the present invention, the NR filter selection unit selects the NR filter by using a threshold level that is set for a block boundary when a pixel that is used for deriving the image characterizing quantity is located on the block boundary.

Here, the block boundary means a boundary between coded blocks when the input image signal is coded, for example.

According to the filter device of the present invention, it is possible to use a threshold level for the block boundary so that the NR filter can be used more easily for pixels on the block boundary. Therefore, block noise can be reduced appropriately. In addition, if a pixel that is used for deriving image characterizing quantity is located on the block boundary, the NR filter can be used more easily even for a pixel that is far from the block boundary. Therefore, block noise generated in a flat region (i.e, smooth region) can be reduced effectively.

According to the filter device of a fourteenth aspect of the present invention, the plurality of NR filters includes an NR filter for a block boundary that is used only when a pixel that is a target of the NR process is located in the vicinity of the block boundary.

According to the filter device of the present invention, it is possible to use an NR filter having a higher filter intensity for a pixel located on a block boundary. Therefore, block noise can be reduced more appropriately.

According to the filter device of a fifteenth aspect of the present invention, the plurality of NR filters further includes an NR filter for a non-block boundary that is used only when a pixel that is a target of the NR process is not located in the vicinity of the block boundary.

According to the filter device of the present invention, it is possible to use a more appropriate NR filter. More specifically, an NR filter for a non-block boundary such as a filter for reducing mosquito noise can be used if necessary.

A filtering method according to a sixteenth aspect of the present invention includes an NR filter selection step and an NR process execution step. The NR filter selection step is for selecting one of the plurality of NR filters in accordance with an image characterizing quantity derived by using pixels in a range determined to correspond to a reference pixel range which each of the plurality of NR filters uses and a threshold level of the image characterizing quantity that is set for each of the plurality of NR filters. The NR process execution step is for performing an NR process on an image signal by using the selected NR filter.

According to the filtering method of the present invention, it is possible to use a common method for deriving the image characterizing quantity when selecting the NR filter. Thus, the process for selecting the NR filter can be simplified. Namely, it is possible to reduce hardware costs in order to perform a process for selecting the NR filter or to reduce the software process load for selecting the NR filter.

According to the filtering method of a seventeenth aspect of the present invention, the NR filter selection step gives higher priority to an NR filter having a larger reference pixel range or an NR filter having larger filter intensity in selecting one of the plurality of NR filters.

According to the filtering method of the present invention, it is possible to use a filter having a higher NR effect with a high priority.

According to the filtering method of an eighteenth aspect of the present invention, the NR filter selection step includes selecting the NR filter by using a threshold level that is set for a block boundary when a pixel that is used for deriving the image characterizing quantity is located on the block boundary.

According to the filtering method of the present invention, it is possible to use a threshold level for a block boundary so that the NR filter can be used more easily for a pixel on a block boundary. Therefore, block noise can be reduced more appropriately.

A filtering program product according to a nineteenth aspect of the present invention is for use in a computer that performs an NR process on an image signal by using an NR filter selected from a plurality of NR filters. The filtering program product includes an NR filter selection step for selecting one of the plurality of NR filters in accordance with an image characterizing quantity derived by using pixels in a range determined to correspond to a reference pixel range which each of the plurality of NR filters uses and a threshold level of the image characterizing quantity that is set for each of the plurality of NR filters, and an NR process execution step for performing an NR process on an image signal by using the selected NR filter.

According to the filtering program product of the present invention, it is possible to use a common method for deriving the image characterizing quantity when selecting the NR filter. Thus, a process for selecting the NR filter can be simplified. Namely, the software process load for selecting the NR filter can be reduced.

According to the filtering program product of a twentieth aspect of the present invention, the NR filter selection step gives higher priority to an NR filter having a larger reference pixel range or an NR filter having a larger filter intensity in selecting one of the plurality of NR filters.

According to the filtering program product of the present invention, it is possible to use a filter having a higher NR effect with a high priority.

According to the filtering program product of a twenty-first aspect of the present invention, the NR filter selection step selects the NR filter by using a threshold level that is set for a block boundary when a pixel that is used for deriving the image characterizing quantity is located on the block boundary.

According to the filtering program product of the present invention, it is possible to use a threshold level for a block boundary so that the NR filter can be used more easily for a pixel on a block boundary. Therefore, block noise can be reduced appropriately.

According to the present invention, a filter device, a filtering method and a filtering program product can be provided that can reduce hardware costs or the software process load.

BRIEF DESCRIPTION OF THE DRAWINGS

FIG. 3 is an explanatory diagram of a relationship between a resolution conversion filter selection signal and a decision result of a vertical NR process decision portion in the first embodiment.

FIG. 6 is an explanatory diagram of a filter application condition in the second embodiment.

FIG. 7 is an explanatory diagram of a horizontal NR filter in the second embodiment.

FIG. 10 is an explanatory diagram of a vertical NR filter in the second embodiment.

FIG. 14 is an explanatory diagram of a horizontal NR filter in a third embodiment of the present invention.

FIG. 24 is an explanatory diagram of a resolution conversion filter in the background art.

FIG. 25 is an explanatory diagram of a conventional deblock filter in the background art.

DESCRIPTION OF THE INVENTION

Hereinafter, the present invention will be explained in more detail with reference to embodiments and drawings.

FIRST EMBODIMENT

Figure 1:
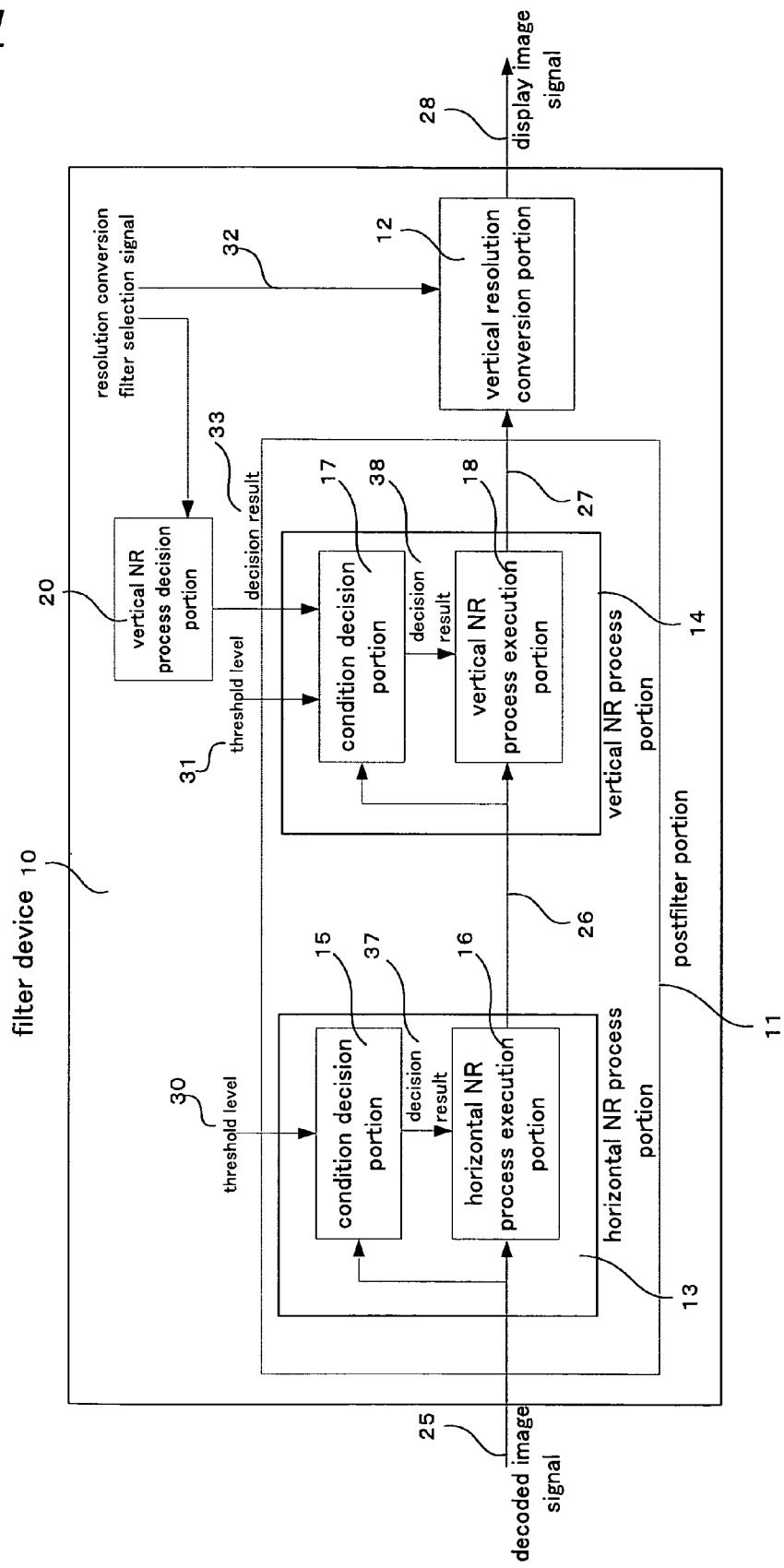
FIG. 1 is a block diagram of a filter device in a first embodiment of the present invention.

A filter device 10 according to a first embodiment of the present invention will be described with reference to FIGS. 1-4. The filter device 10 shown in FIG. 1 is characterized in that it will decide whether or not a vertical NR process should be performed in accordance with a selection signal of a vertical resolution conversion filter.

(Structure of the Filter Device 10)

The filter device 10 includes a postfilter portion 11 for performing a horizontal and vertical NR process on a decoded image signal 25 so as to produce an NR processed signal 27, a vertical resolution conversion portion 12 for performing a vertical resolution conversion on the NR processed signal 27 so as to produce a display image signal 28, and a vertical NR process decision portion 20 for deciding whether or not the postfilter portion 11 should perform a vertical NR process.

The postfilter portion 11 includes a horizontal NR process portion 13 that receives the decoded image signal 25 and produces a horizontal NR processed signal 26, and a vertical NR process portion 14 that receives the horizontal NR processed signal 26 and produces the NR processed signal 27.

The horizontal NR process portion 13 is a portion for performing a horizontal NR process on the decoded image signal 25, which includes a condition decision portion 15 and a horizontal NR process execution portion 16. The condition decision portion 15 receives the decoded image signal 25 as a first input and a set threshold level 30 as a second input so as to produce a decision result 37 as to whether or not a horizontal NR filter is used for the decoded image signal 25. The horizontal NR process execution portion 16 receives the decoded image signal 25 as a first input and the decision result 37 as a second input so as to produce the horizontal NR processed signal 26 that is obtained by performing the horizontal NR process corresponding to the decision result 37 on the decoded image signal 25.

The vertical NR process portion 14 is a portion for performing a vertical NR process on the horizontal NR processed signal 26, which includes a condition decision portion 17 and a vertical NR process execution portion 18. The condition decision portion 17 receives the horizontal NR processed signal 26 as a first input, receives a set threshold level 31 as a second input and receives the decision result 33 of the vertical NR process decision portion 20 as a third input so as to produce a decision result 38 about whether or not a vertical NR filter is used for the horizontal NR processed signal 26. The vertical NR process execution portion 18 receives the horizontal NR processed signal 26 as a first input and the decision result 38 as a second input so as to produce the NR processed signal 27 that is obtained by performing the vertical NR process corresponding to the decision result 38 on the horizontal NR processed signal 26.

The vertical resolution conversion portion 12 receives the NR processed signal 27 as a first input and the resolution conversion filter selection signal 32 as a second input so as to produce a display image signal 28 that is obtained by performing the resolution conversion process corresponding to the resolution conversion filter selection signal 32 on the NR processed signal 27.

The vertical NR process decision portion 20 receives the resolution conversion filter selection signal 32 and produces the decision result 33 about whether or not the postfilter portion 11 performs the vertical NR process.

(Operation of the Filter Device 10)

The horizontal NR process portion 13 performs the horizontal NR process on the decoded image signal 25. The condition decision portion 15 decides an application condition as to whether or not the horizontal NR filter should be used for the decoded image signal 25 in accordance with the set threshold level 30. The horizontal NR process execution portion 16 performs the horizontal NR process on the decoded image signal 25 in accordance with the decoded image signal 25 and the decision result of the condition decision portion 15, so as to produce the horizontal NR processed signal 26.

The vertical NR process portion 14 performs the vertical NR process on the horizontal NR processed signal 26. The condition decision portion 17 decides an application condition as to whether or not the vertical NR filter should be used for the horizontal NR processed signal 26 in accordance with the set threshold level 31 and the decision result 33 of the vertical NR process decision portion 20. The vertical NR process execution portion 18 performs the vertical NR process on the horizontal NR processed signal 26 in accordance with the horizontal NR processed signal 26 and the decision result of the condition decision portion 17, so as to produce the NR processed signal 27.

Figure 2:
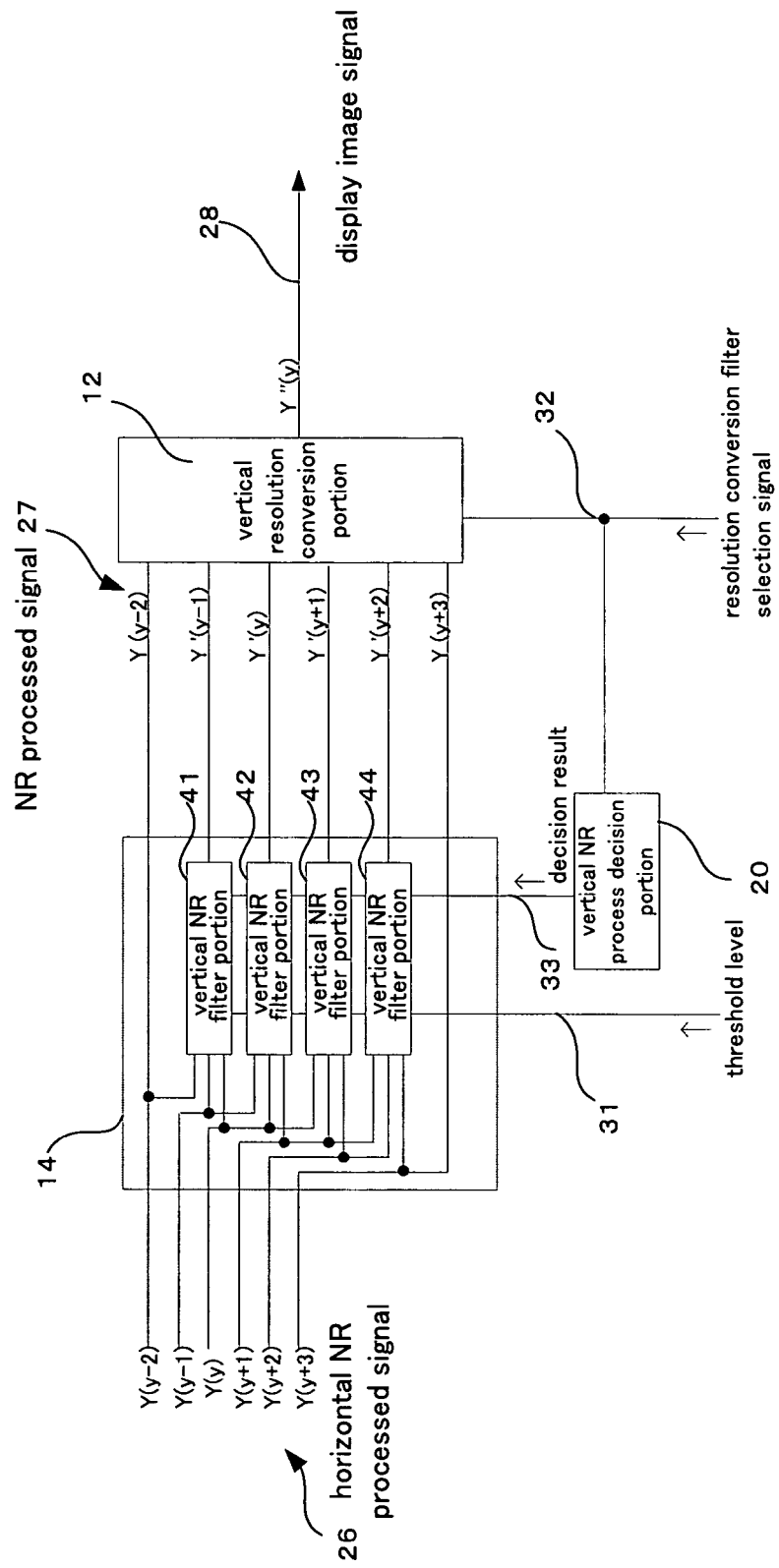
FIG. 2 is a block diagram of a vertical NR filter portion in the first embodiment.

FIG. 2 shows a block diagram of a vertical NR filter portion that is used for the vertical NR process portion 14. The vertical NR process portion 14 receives the horizontal NR processed signal 26. The horizontal NR processed signal 26 is supplied as pixel values Y(y−2) to Y(y+3) of six lines at the same position in the horizontal direction from line memory (not shown) which stores the horizontal NR processed signal 26 of the corresponding line. Note that the line memory (not shown) may store the decoded image signal 25 instead of the horizontal NR processed signal 26, and the horizontal NR processed signal 26 may be supplied directly to the vertical NR process portion and not via the line memory (not shown). Furthermore, instead of the line memory (not shown), a frame memory (not shown) may be used that can simultaneously obtain a plurality of lines of pixels at the same position in the horizontal direction.

The vertical NR process portion 14 includes four vertical NR filter portions 41-44. Each of the vertical NR filter portions 41-44 has a vertical NR filter whose number of filter taps is [3], which is supplied with every three lines of pixel values Y(y−2) to Y(y+3).

The vertical NR filter portions 41-44 perform a filtering process in accordance with the supplied pixel values Y(y−2) to Y(y+3), the set threshold level 31 and the decision result 33 of the vertical NR process decision portion 20, so as to produce the NR processed signal 27 having pixel values Y'(y−1) to Y'(y+2) after the filtering process.

More specifically, if the decision result 33 of the vertical NR process decision portion 20 decides that the vertical NR filters should not be used (i.e., filter through), the pixel value Y'(y) that is identical to Y(y) will be the output of the vertical NR filter portions 41-44. On the other hand, if the decision result 33 is that the vertical NR filter should be used, each of the vertical NR filter portions 41-44 performs the filtering process in the same way as described above with reference to FIG. 23. For example, the vertical NR filter portion 42 has a vertical NR filter whose number of filter taps is [3] that uses three pixels of "y−1", "y" and "y+1" for the filter application pixel "y" of the pixel value Y(y). Whether the vertical NR filter should be used for the filter application pixel "y" is decided by using the filter application condition F1 shown in FIG. 23.

Figure 23:
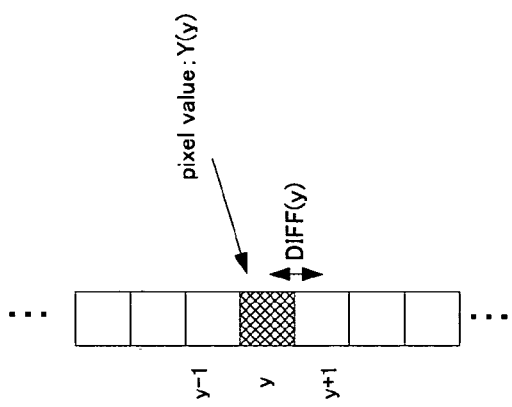
FIG. 23 is an explanatory diagram of a filter application condition in the background art.

The filter application condition F1 shown in FIG. 23 is a function of a constant parameter TH_d and a comparison function CMP(y). The filter application condition F1 is a function that produces a value indicating that the filter should be used (for example, a value [1]) when the filter application pixel "y" is decided to be included in a flat region (smooth region) of an image in accordance with an image characterizing quantity F2 or a constant parameter. More specifically, it produces a value indicating that the filter should be used by comparing a result of one of four fundamental operations of arithmetic or other operation between the comparison functions CMP(y−1) and CMP(y) with the threshold level TH_d. Note that the filter application condition F1 may indicate that the filter should be used when the result of one of four fundamental operations of arithmetic or other operation becomes a specific value.

Here, the image characterizing quantity is, for example, a value indicating a flatness (smoothness) of the filter application pixel "y" and is determined in accordance with a difference between neighboring pixels. More specifically, it is determined by calculating an absolute value of the difference between neighboring pixels or a square value of the difference between neighboring pixels, for example. Furthermore, the comparison function CMP(y) compares the threshold level with the image characterizing quantity, so as to produce a value indicating the comparison result. For example, CMP(y) produces a value [1] when the threshold level is larger.

If a value of the filter application condition F1 is [1], a filter of a filter factor [1,2,1] is used for the pixels of "y−1", "y" and "y+1", so that the pixel value Y'(y) is produced. Namely, each of the vertical NR filter portions 41-44 works as the condition decision portion 17 as well as the vertical NR process execution portion 18.

On the other hand, in the horizontal NR processed signal 26 received by the vertical NR process portion 14, the pixel value Y(y−2) and the pixel value Y(y+3) are delivered as the NR processed signal 27 without any change.

The vertical resolution conversion portion 12 performs a vertical resolution conversion of the NR processed signal 27 that is supplied from the postfilter portion 11 and produces the display image signal 28. The vertical resolution conversion portion 12 includes a plurality of vertical resolution conversion filters that are used corresponding to a conversion ratio of the vertical resolution. One of the plurality of vertical resolution conversion filters is selected in accordance with the resolution conversion filter selection signal 32. Operations of the resolution conversion filter selection signal 32 and each of the vertical resolution conversion filters are the same as described above with reference to FIG. 24. Namely, the vertical resolution conversion portion 12 selects the resolution conversion filter in accordance with three values [0]-[2] designated by the resolution conversion filter selection signal 32. For example, if the value [0] is designated, the resolution conversion is not performed while the pixel value Y"(y) that is identical to Y'(y) is produced as the display image signal 28. If the value [1] is designated, the pixel value Y"(y) that is derived from six pixel values Y(y−2), Y'(y−1) to Y'(y+2) and Y(y+3) is delivered. Here, the value [1] is designated when the vertical conversion of resolution is not a conversion having a simple conversion ratio such as an integer or an inverse number of an integer but is a conversion having large number of filter taps or when using a filter having large number of taps for high image quality in a conversion having a simple conversion ratio, for example. If the value [2] is designated, the pixel value Y"(y) that is derived from four pixel values Y'(y−1) to Y'(y+2) is delivered. Here, the value [2] is designated when the vertical conversion of resolution has a simple conversion ratio such as an integer or an inverse number of an integer and the number of filter taps is small, for example.

Here, the resolution conversion filter selection signal 32 is obtained from a decoding device that performs decoding of the decoded image signal 25 (see FIG. 1). More specifically, when the decoding device performs the decoding of the decoded image signal 25, the conversion ratio of resolution is determined from the image size, the aspect ratio or the like of the decoded image signal 25, so that the resolution conversion filter selection signal 32 is supplied in accordance with this.

The vertical NR process decision portion 20 decides whether or not the vertical NR filter should be used in accordance with the resolution conversion filter selection signal 32. FIG. 3 shows the relationship between the resolution conversion filter selection signal 32 and the decision result 33 of the vertical NR process decision portion 20. If the resolution conversion filter selection signal 32 indicates the value [1], the vertical NR process decision portion 20 decides not to use the vertical NR filter (filter through) and delivers the value [1] as the decision result 33 (see FIG. 3(*a*)). If the resolution conversion filter selection signal 32 indicates the value [0] or the value [2], the vertical NR process decision portion 20 decides to use the vertical NR filter and delivers the value [0] as the decision result 33 (see FIG. 3(*b*)).

Note that the values of the resolution conversion filter selection signal, the decision result, the filter application condition F1 and others are not limited to the values shown above.

(Filtering Method)

Figure 4:
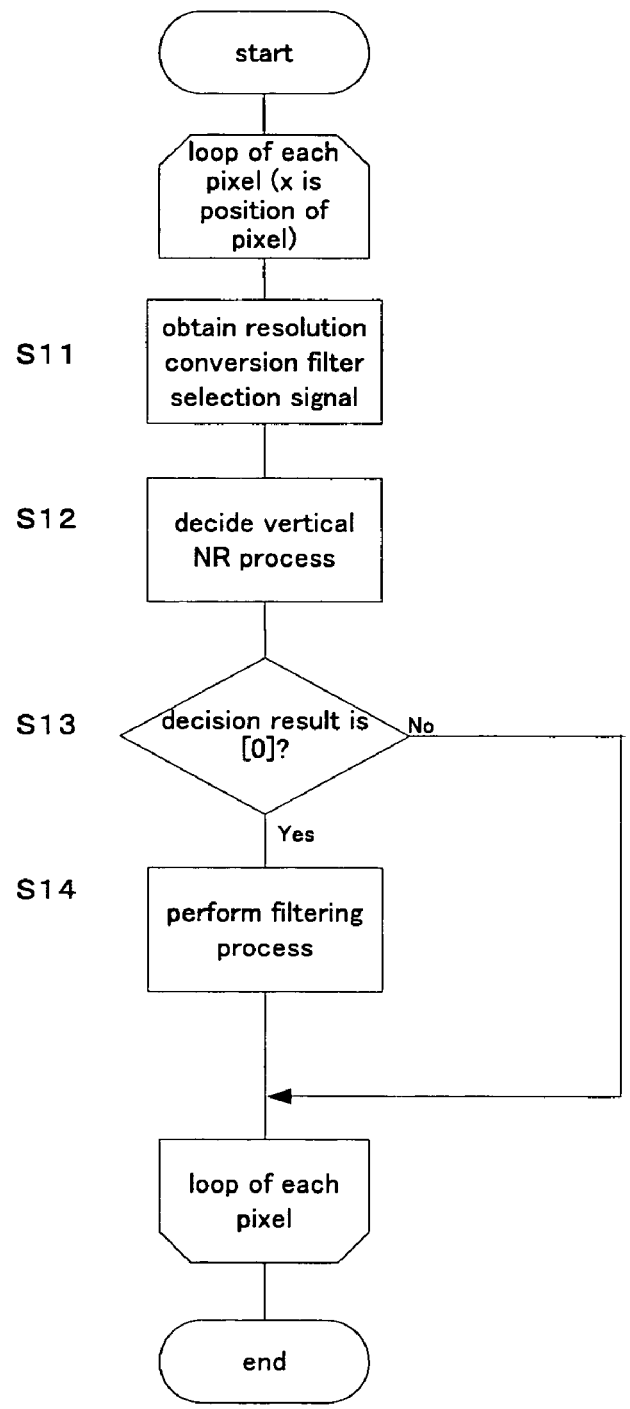
FIG. 4 is a flowchart of a filtering method according to the first embodiment.

FIG. 4 shows a flowchart of a filtering method in the filter device 10, particularly a filtering method in the vertical NR process decision portion 20 and the vertical NR process portion 14.

This filtering method is a process that is performed for each pixel of the NR processed signal 27 that is delivered from the vertical NR filter portions 41-44 (steps S11-S14). The vertical NR process decision portion 20 obtains the resolution conversion filter selection signal 32 (step S11) and decides whether or not the vertical NR process portion 14 should perform the vertical NR process (step S12). The vertical NR process portion 14 performs the vertical NR process of the horizontal NR processed signal 26 (step S14) when the decision result 33 indicates the value [0] (step S13). On the other hand, if the decision result 33 indicates the value [1] (step S13), the vertical NR process portion 14 does not perform the vertical NR process on the horizontal NR processed signal 26 and starts the process on the next filter application pixel (steps S11-S14).

The filtering method described above can be realized by a program using a computer without being limited to the filter device 10.

(Effects of the First Embodiment)

Figure 22:
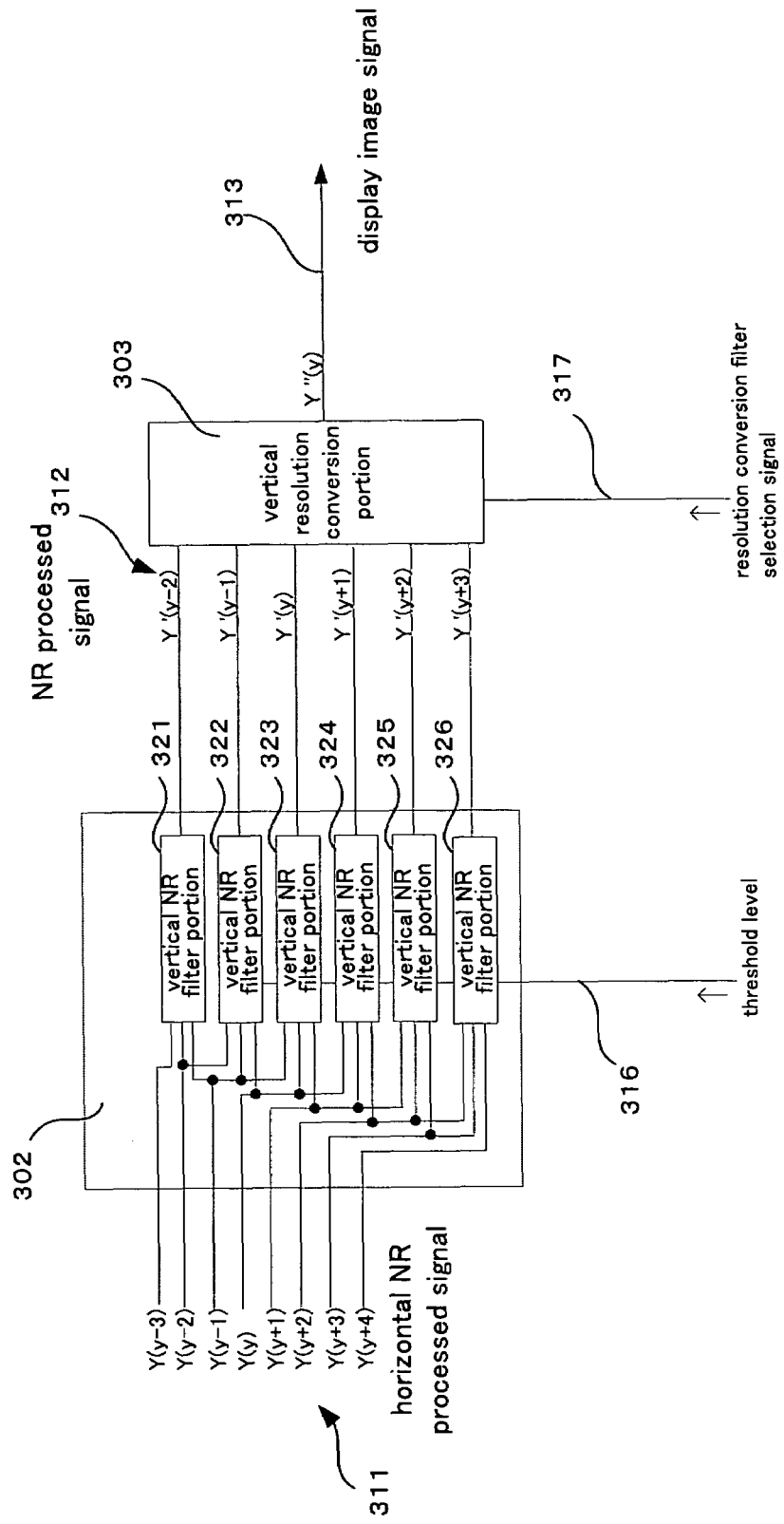
FIG. 22 is a block diagram of a vertical NR filter portion in the background art.

(1) It is not necessary to provide a vertical NR filter portion for Y(y−2) and Y(y+3) that are always used in a state in which the vertical NR process is not performed among the NR processed signal 27 that is used by the vertical resolution conversion portion 12. Namely, hardware costs can be reduced compared with the conventional vertical NR process portion 302 (see FIG. 22).

(2) If the vertical conversion of resolution is not a conversion having a simple conversion ratio such as an integer or an inverse number of an integer, a complicated resolution conversion filter having a large number of taps is selected. Here, when a complicated conversion ratio is required, such as a conversion from the aspect ratio of 4:3 to the aspect ratio 16:9, there is usually little noise in the decoded image signal 25, like when playing DVD contents. Therefore, even if the vertical NR process is not performed on the horizontal NR processed signal 26, the image quality of the display image signal 28 can be maintained.

(3) In the conventional vertical NR process portion 302, the NR processed signal 312 can be always processed by the vertical NR process. Therefore, for example, the horizontal NR processed signal 311 of eight lines is necessary for delivering the NR processed signal 312 of six lines (see FIG. 22). Namely, the number of lines of the horizontal NR processed signal 311 that is necessary for obtaining the NR processed signal 312 is larger than the number of lines of the NR processed signal 312.

On the other hand, in the vertical NR process portion 14 according to the present invention, a portion of the NR processed signal 27 (pixel values Y(y−2) and Y(y+3) in FIG. 2) is always identical to a portion of the horizontal NR processed signal 26. Therefore, in order to obtain the NR processed signal 27 of six lines that is similar to that of a conventional device, the horizontal NR processed signal 26 of six lines is necessary. Namely, the number of lines of the horizontal NR processed signal 26 that is necessary for obtaining the NR processed signal 27 is the same as the number of lines of the NR processed signal 27, so that the number of lines of the horizontal NR processed signal 26 can be reduced in order to obtain the NR processed signal 27 of the same number of lines as a conventional device. As a result, the number of line memories for obtaining the horizontal NR processed signal 26 needed for the vertical NR process can be reduced.

(4) In the conventional vertical NR process portion 302, the NR processed signal 312 can be always processed by the vertical NR process. Therefore, the number of the vertical NR filter portions that are used for obtaining the NR processed signal is equal to the number of lines of the NR processed signal 312, i.e., the maximum number of lines of the NR processed signal 312 that is used for the vertical resolution conversion by the vertical resolution conversion portion 303.

On the other hand, in the vertical NR process portion 14 according to the present invention, a portion of the NR processed signal 27 is always identical to a portion of the horizontal NR processed signal 26. Therefore, the number of the vertical NR filter portions that are necessary to obtain the NR processed signal 27 of six lines similar to that of a conventional device is four, so that the number of the vertical NR filter portions can be reduced.

(Modifications)

(1) The vertical NR process portion 14 may perform the NR process a plurality of times using one vertical NR filter portion instead of the plurality of vertical NR filter portions 41-44.

In this case, the quantity of processing for the NR process can be reduced.

(2) The condition decision portion 17 may decide the condition by using the decoded image signal 25. In this case, the condition decision portion 17 becomes able to work in parallel with the horizontal NR process before the horizontal NR process is completed, so that the entire process speed of the filter device 10 can be improved.

(3) It is possible to adopt a structure for the horizontal NR process portion 13 that is the same as described in the above embodiment.

SECOND EMBODIMENT

The horizontal and vertical NR filter of the filter device can be one that is selected from a plurality of candidate filters. This NR filter will be described with reference to FIGS. 5-13.

(Structure of a Filter Device 50)

Figure 5:
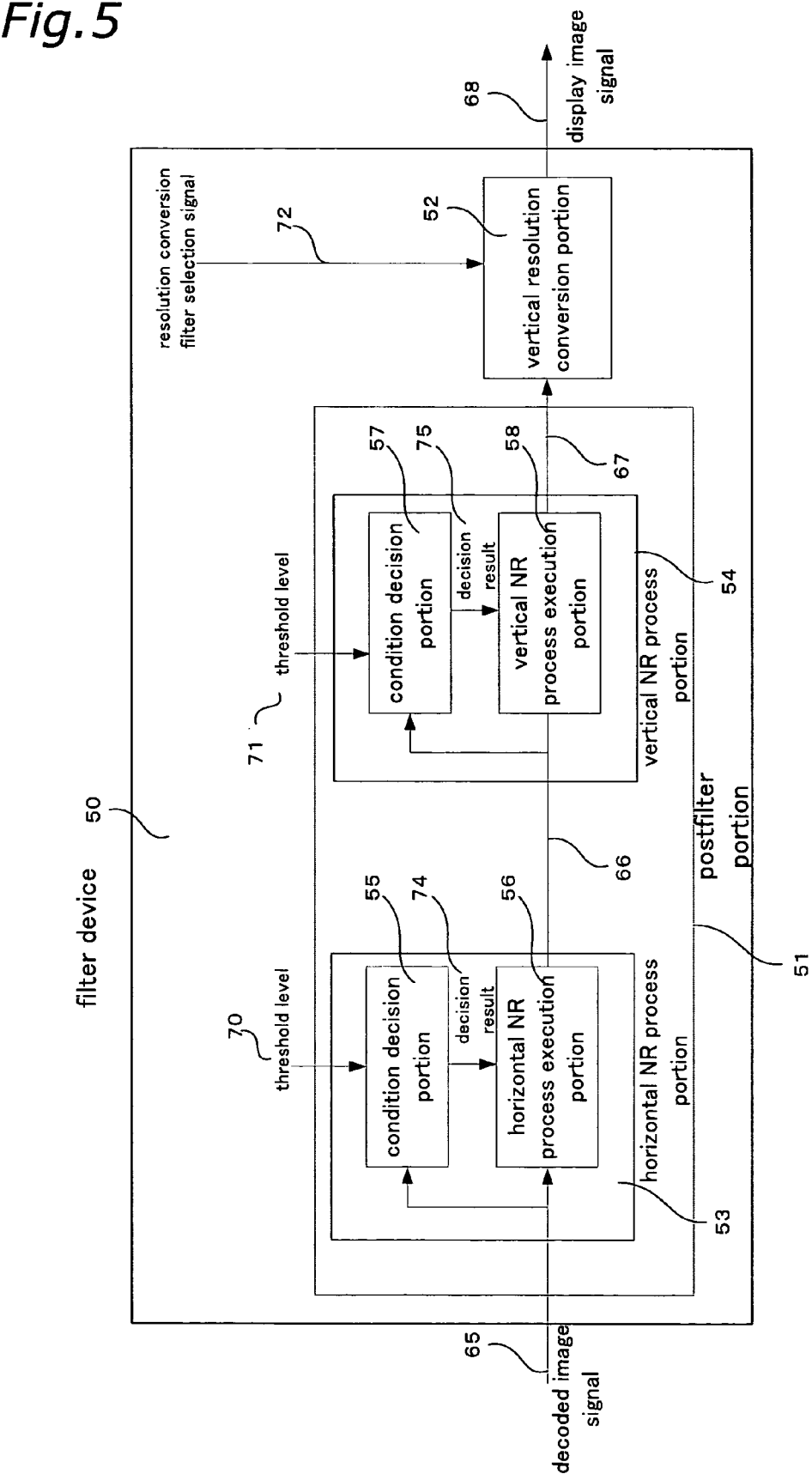
FIG. 5 is a block diagram of a filter device in a second embodiment of the present invention.

FIG. 5 shows a filter device 50 having a horizontal and vertical NR filter that is one selected from a plurality of candidate filters.

The filter device 50 includes a postfilter portion 51 for performing a horizontal and vertical NR process on the decoded image signal 65 so as to deliver a NR processed signal 67, and a vertical resolution conversion portion 52 for performing the vertical resolution conversion on the NR processed signal 67 so as to deliver a display image signal 68.

The postfilter portion 51 includes a horizontal NR process portion 53 that receives the decoded image signal 65 and produces a horizontal NR processed signal 66, and a vertical NR process portion 54 that receives the horizontal NR processed signal 66 and produces the NR processed signal 67.

The horizontal NR process portion 53, which is a portion for performing the horizontal NR process on the decoded image signal 65, includes a condition decision portion 55 and a horizontal NR process execution portion 56. The condition decision portion 55 receives the decoded image signal 65 as a first input and a set threshold level 70 as a second input, selects the horizontal NR filter that is used for the decoded image signal 65, and produces a selection result 74. The horizontal NR process execution portion 56 receives the decoded image signal 65 as a first input and the selection result 74 as a second input so as to produce the horizontal NR processed signal 66 that is obtained by the horizontal NR process on the decoded image signal 65 corresponding to the selection result 74.

The vertical NR process portion 54, which is a portion for performing the vertical NR process on the horizontal NR processed signal 66, includes a condition decision portion 57 and a vertical NR process execution portion 58. The condition decision portion 57 receives the horizontal NR processed signal 66 as a first input and a set threshold level 71 as a second input, selects the vertical NR filter that is used for the horizontal NR processed signal 66, and produces a selection result 75. The vertical NR process execution portion 58 receives the horizontal NR processed signal 66 as a first input and the selection result 75 as a second input so as to deliver the NR processed signal 67 that is obtained by the vertical NR process on the horizontal NR processed signal 66 corresponding to the selection result 75.

The vertical resolution conversion portion 52 receives the NR processed signal 67 as a first input and the resolution conversion filter selection signal 72 as a second input so as to deliver the display image signal 68 that is obtained by the resolution conversion process on the NR processed signal 67 corresponding to the resolution conversion filter selection signal 72.

(NR Filter and NR Filter Selection)

The NR filters of the horizontal NR process portion 53 and the vertical NR process portion 54, and selection of the NR filter will now be described. According to the present invention, each of the horizontal NR process portion 53 and the vertical NR process portion 54 has a plurality of NR candidate filters and performs the NR process on a filter application pixel by selecting one NR filter from the plurality of NR candidate filters.

The plurality of candidate filters FH1-FH3, . . . have the numbers of filter taps FH1tap-FH3tap, . . . and threshold levels TH1-TH3, . . . used by the filters, respectively. Here, it is assumed that filter intensity of the candidate filter FHk is smaller as the value of k increases. In addition, it is assumed that the number of filter taps FHktap decreases monotonously along with k, and each of the threshold levels THk and TH_dk increases monotonously along with k. Here, it is assumed that the candidate filter having larger threshold levels THk and TH_dk tends to be selected. Namely, as the value of k increases, the candidate filter FHk tends to be selected.

FIG. 6 shows a filter application condition F30 for deciding whether or not the filter FHk should be used for a filter application pixel "x" having a pixel value Y(x). The filter application condition F30 is a function of a constant parameter TH_dk and a comparison function CMPk(x) (see the equation F32). The filter application condition F30 is a function that produces a value (for example, the value [1]) that indicates that the filter should be used when the filter application pixel "x" is decided to be included in a flat region (smooth region) of the image in accordance with an image characterizing quantity DIFF(x) or a constant parameter THk. More specifically, a result of one of four fundamental operations of arithmetic or other operation of values of the comparison function CMPk(x) is compared with the threshold level TH_dk so that the value is produced that indicates that the filter should be used. Note that the filter application condition F30 may be that the filter is used when a result of one of four fundamental operations of arithmetic or other operation of values of the comparison function CMPk(x) becomes a specific value.

Here, the image characterizing quantity DIFF(x) is a value that is defined by the equation F31 and indicates a flatness (smoothness) of the filter application pixel "x", for example. More specifically, it is determined by calculating an absolute value of the difference between neighboring pixels or a square value of the difference between neighboring pixels, for example. Furthermore, THk and TH_dk are threshold levels for each of the candidate filters. Furthermore, the comparison function CMPk(x) compares the threshold level with the image characterizing quantity, so as to produce a value indicating the comparison result. For example, CMPk(y) produces a value [1] when the threshold level is larger.

If a value of the filter application condition F30 is [1], the filter FHk is used for the filter application pixel "x". Furthermore, if there are a plurality of filters FHk in which a value of the filter application condition F30 becomes [1], one having a smaller value of k, i.e., one having larger filter intensity or one having a larger number of filter taps is selected with higher priority.

(Structure of the Horizontal NR Process Portion 53)

The NR filter shown in FIG. 6 and a specific hardware structure for realizing selection of the NR filter will be described with reference to FIGS. 7-9. The horizontal NR process portion 53 selects the NR filter and performs the NR process on the decoded image signal 65 that is sequentially input by pixel position.

FIG. 7 shows numbers of filter taps, filter factors and threshold levels of three horizontal NR filters FH1-FH3 that are used and switched in the horizontal NR process portion 53. The horizontal NR filter FH1 has the number of filter taps FH1tap=[7], the filter factor [1, 1, 1, 2, 1, 1, 1], and the threshold level TH1=[8]. The horizontal NR filter FH2 has the number of filter taps FH2tap=[5], the filter factor [1, 1, 4, 1, 1], and the threshold level TH2=[16]. The horizontal NR filter FH3 has the number of filter taps FH3tap=[3], the filter factor [2,4,2], and the threshold level TH3=[32].

Figure 8:
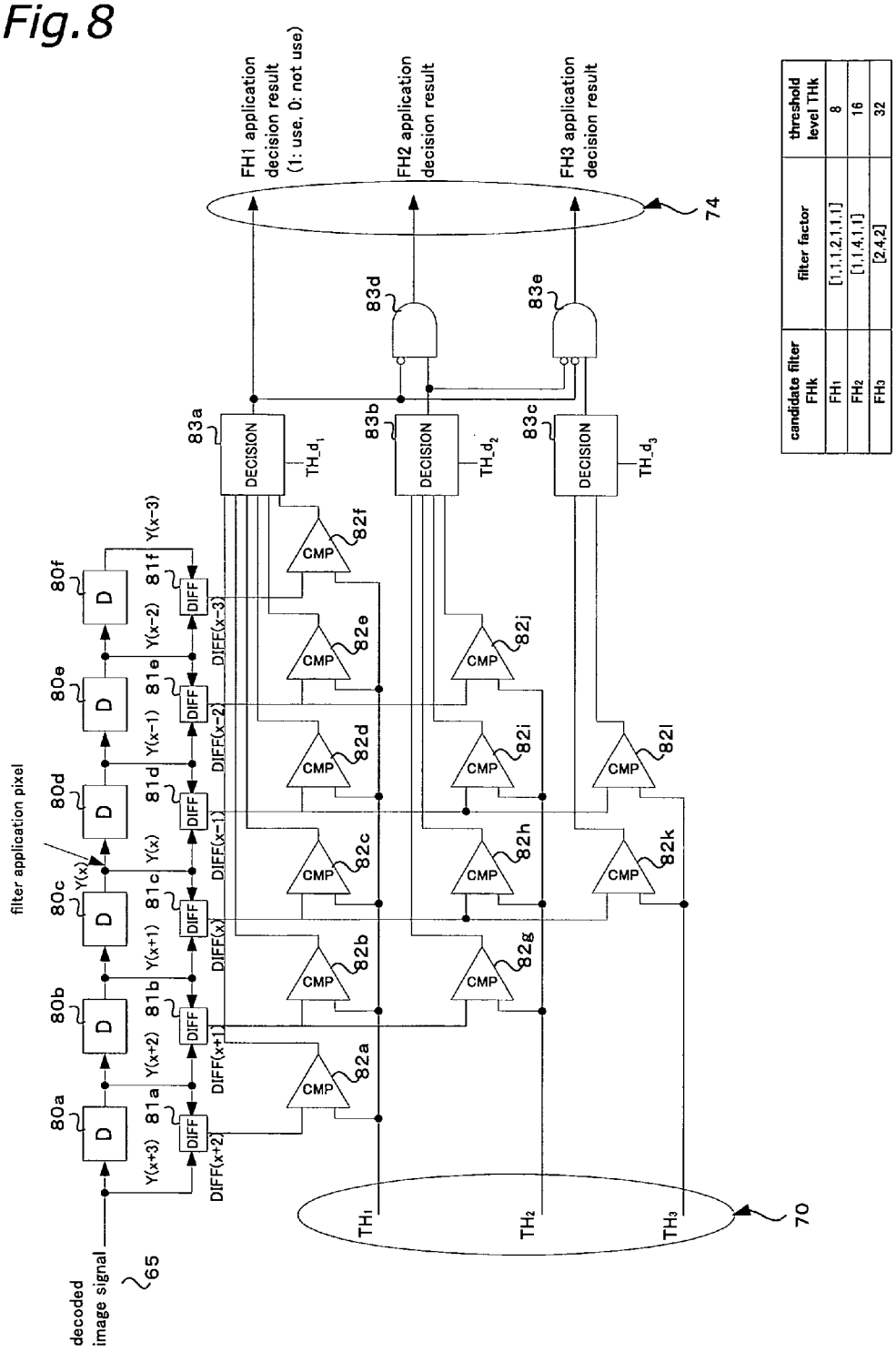
FIG. 8 shows a hardware structure of a condition decision portion in the second embodiment.

FIG. 8 shows a hardware structure of the condition decision portion 55. The condition decision portion 55 receives the decoded image signal 65 as a first input and the set threshold level 70 (TH1-TH3) as a second input, selects horizontal NR filters FH1-FH3 that are used for the decoded image signal 65, and delivers the selection result 74. The condition decision portion 55 includes delay elements 80a-80f of one pixel delay, computing elements 81a-81f for calculating the image characterizing quantity in accordance with pixel values of neighboring pixels, comparators 82a-82l for realizing the comparison function CMPk(x) defined by the equation F32, decision elements 83a-83c for realizing the filter application condition F30, and AND gates 83d and 83e for selecting one horizontal NR filter that is used for the filtering process from horizontal NR filters FHk that satisfy the filter application condition F30.

The delay elements 80a-80f are connected to the decoded image signal 65 in series for one pixel delay, and produce pixel values Y(x+2) to Y(x−3) of the past six pixels from the pixel value Y(x+3) received as the decoded image signal 65.

Each of the computing elements 81a-81f calculates the image characterizing quantity from the input and the output of each of the delay elements 80a-80f. Namely, the computing elements 81a-81f calculate the image characterizing quantities DIFF(x+2) to DIFF(x−3) defined by the equation F31 for the pixel values Y(x+3) to Y(x−3), respectively.

Each of comparators 82a-82f receives one of the image characterizing quantities DIFF(x+2) to DIFF(x−3) as a first input and the threshold level TH1 of the horizontal NR filter FH1 as a second input so as to produce one of the comparison results. Namely, each of the comparators 82a-82f compares one of the image characterizing quantities DIFF(x+2) to DIFF(x−3) with the threshold level TH1 of the horizontal NR filter FH1 so as to deliver the comparison result to the decision element 83a. Each of comparators 82g-82j receives one of the image characterizing quantities DIFF(x+1) to DIFF(x−2) as a first input and the threshold level TH2 of the horizontal NR filter FH2 as a second input so as to produce one of the comparison results. Namely, each of the comparators 82g-82j compares one of the image characterizing quantities DIFF(x+1) to DIFF(x−2) with the threshold level TH2 of the horizontal NR filter FH2 so as to deliver the comparison result to the decision element 83b. Each of comparators 82k and 82l receives one of the image characterizing quantities DIFF(x) and DIFF(x−1) as a first input and the threshold level TH3 of the horizontal NR filter FH3 as a second input so as to produce one of the comparison results. Namely, each of the comparators 82k and 82l compares one of the image characterizing quantities DIFF(x) and DIFF(x−1) with the threshold level TH3 of the horizontal NR filter FH3 so as to deliver the comparison result to the decision element 83c.

The decision element 83a receives outputs of the comparators 82a-82f and the threshold level TH_d1 for these outputs so as to calculate the filter application condition F30. More specifically, if the pixels "x+3" to "x−3" are decided to be in a flat region (smooth region) for example, the value [1] is delivered so as to indicate that the horizontal NR filter FH1 satisfies the filter application condition F30. The decision element 83b receives outputs of the comparators 82g-82j and the threshold level TH_d2 for these outputs so as to calculate the filter application condition F30. More specifically, if the pixels "x+2" to "x−2" are decided to be in a flat region (smooth region), the value [1] is delivered so as to indicate that the horizontal NR filter FH2 satisfies the filter application condition F30. The decision element 83c receives outputs of the comparators 82k and 82l and the threshold level TH_d3 for these outputs so as to calculate the filter application condition F30. More specifically, if the pixels "x+1" to "x−1" are decided to be in a flat region (smooth region) for example, the value [1] is delivered so as to indicate that the horizontal NR filter FH3 satisfies the filter application condition F30.

Here, the output of the decision element 83a is delivered as the selection result 74 to the horizontal NR process execution portion 56. Namely, if the output of the decision element 83a indicates the value [1], it means that the horizontal NR filter FH1 is used for the filter application pixel "x". The output of the decision element 83b is received by the AND gate 83d. The AND gate 83d receives negation of the output value of the decision element 83a as a first input and the output value of the decision element 83b as a second input so as to deliver the selection result 74. Namely, if the output of the decision element 83a indicates the value [0] and the output of the decision element 83b indicates the value [1], the AND gate 83d delivers the value [1] so as to indicate that the horizontal NR filter FH2 is used for the filter application pixel "x". The output of the decision element 83c is received by the AND gate 83e. The AND gate 83e receives negation of the output value of the decision element 83a as a first input, negation of the output value of the decision element 83b as a second input and the output value of the decision element 83c as a third input so as to deliver the selection result 74. Namely, if the outputs of the decision elements 83a and 83b indicate the value [0] and the output of the decision element 83c indicates the value [1], the AND gate 83e delivers the value [1] so as to indicate that the horizontal NR filter FH3 is used for the filter application pixel "x". As described above, the selection result 74 is an output of a value that indicates whether each of the horizontal NR filters FH1-FH3 is used or not.

Figure 9:
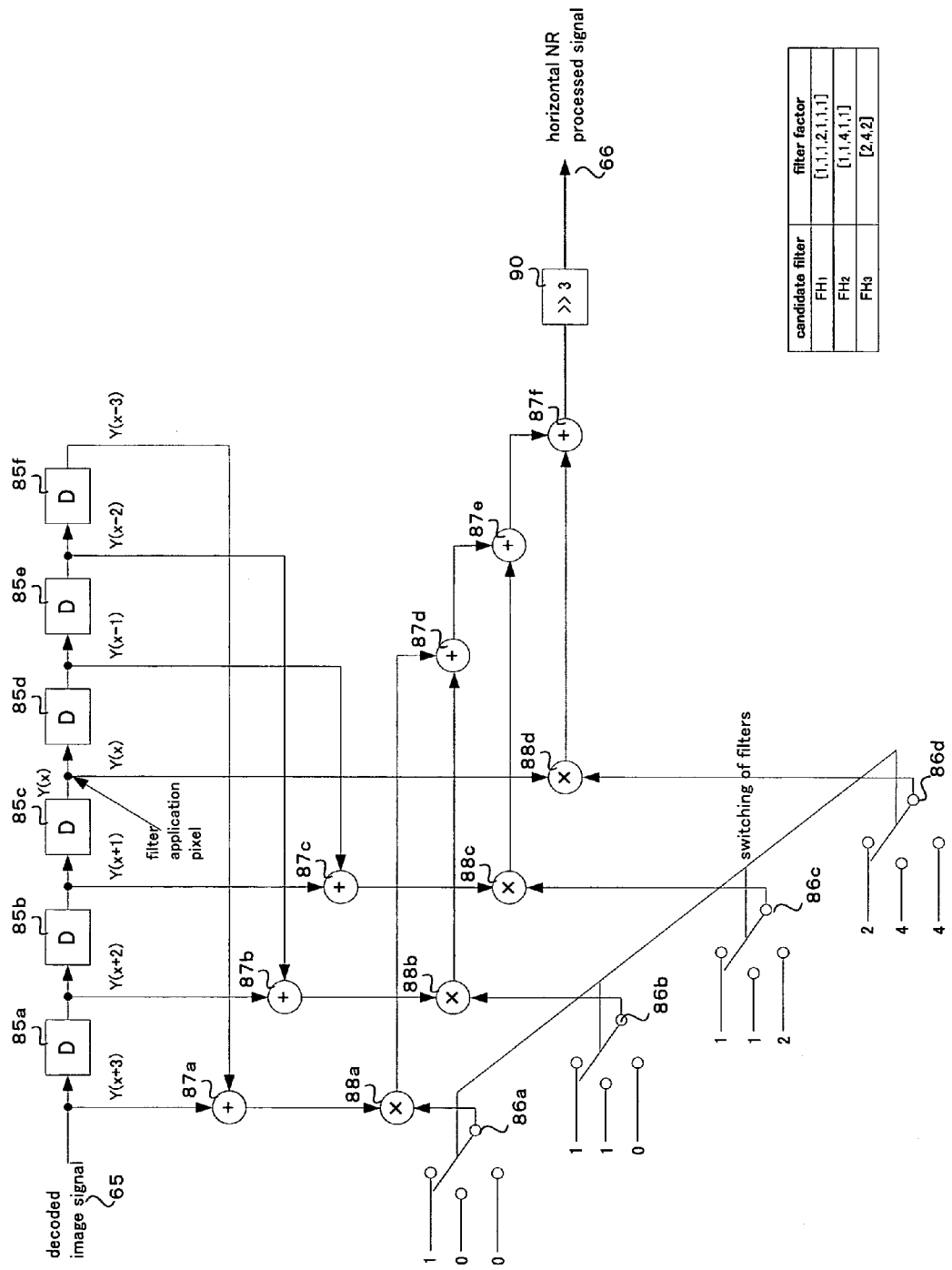
FIG. 9 shows a hardware structure of a horizontal NR process execution portion in the second embodiment.

FIG. 9 shows a hardware structure of the horizontal NR process execution portion 56. The horizontal NR process execution portion 56 receives the decoded image signal 65 as a first input and the selection result 74 as a second input, so as to produce the horizontal NR processed signal 66 that is obtained by performing the horizontal NR process on the decoded image signal 65 corresponding to the selection result 74. The horizontal NR process execution portion 56 includes delay elements 85a-85f for one pixel delay, adders 87a-87f for performing adding operation of signals, multipliers 88a-88d for performing multiplying operation of the filter factors, switches 86a-86d for designating the filter factors, and a divider 90 for performing dividing operation of a value of sum of products of the filter factor and the decoded image signal 65.

The delay elements 85a-85f are connected to the decoded image signal 65 in series for one pixel delay, and produce pixel values Y(x+2) to Y(x−3) of the past six pixels from the pixel value Y(x+3) received as the decoded image signal 65. The adders 87a-87c perform adding operation of pixel values having the same filter factor that are multiplied even if any one of the horizontal NR filters FH1-FH3 is used. The adder 87a adds the pixel value Y(x+3) and the pixel value Y(x−3). The adder 87b adds the pixel value Y(x+2) and the pixel value Y(x−2). The adder 87c adds pixel value Y(x+1) and the pixel value Y(x−1).

The multipliers 88a-88d multiply the outputs of adders 87a-87c and the delay element 85c by the filter factor of the horizontal NR filter indicated by the selection result 74 of the condition decision portion 55. The multiplier 88a receives the output of the adder 87a as a first input and the output of the switch 86a as a second input so as to multiply these inputs. The multiplier 88b receives the output of the adder 87b as a first input and the output of the switch 86b as a second input so as to multiply these inputs. The multiplier 88c receives the output of the adder 87c as a first input and the output of the switch 86c as a second input so as to multiply these inputs. The multiplier 88d receives the output of the delay element 85c (pixel value Y(x)) as a first input and the output of the switch 86d as a second input so as to multiply these inputs.

The switches 86a-86d operate responding to the selection result 74 of the condition decision portion 55, and the operation of the switch designates the filter factor that is multiplied to the output of the adders 87a-87c or to the delay element 85c. The switches 86a-86d designate the upper filter factor if the horizontal NR filter FH1 is used, designate the middle filter factor if the horizontal NR filter FH2 is used, and designate the lower filter factor if the horizontal NR filter FH3 is used.

The adders 87d-87f add all outputs of the multipliers 88a-88d. The adding result is divided by the sum of filter factors in the divider 90. Here, the sum of filter factors is set to be the value [8] if any one of the horizontal NR filters FH1-FH3 is selected. Therefore, the divider 90 can perform the dividing operation by shifting operation of three bits. The dividing result of the divider 90 is delivered as the horizontal NR processed signal 66.

(Structure of the Vertical NR Process Portion 54)

The NR filter shown in FIG. 6 and a specific hardware structure for realizing selection of the NR filter will be described with reference to FIGS. 10-12. The vertical NR process portion 54 stores the horizontal NR processed signal 66 that is output by line position from the horizontal NR process portion 53 in a line memory (not shown) for each line, and selection of the NR filter and the NR process are performed for the filter application pixel included in the stored line. Note that the line memory (not shown) may store the decoded image signal 25 instead of the horizontal NR processed signal 26, and the horizontal NR processed signal 26 may be supplied to the vertical NR process portion not via the line memory (not shown). Furthermore, instead of the line memory (not shown), a frame memory (not shown) may be used that can obtain simultaneously a plurality of lines of pixels at the same position in the horizontal direction.

The vertical NR process portion 54 includes a plurality of vertical NR filter portions. The number of vertical NR filter portions included in the vertical NR process portion 54 depends on the number of lines after the vertical NR process that the vertical resolution conversion portion 52 uses for the vertical resolution conversion process. For example, if the vertical resolution conversion portion 52 needs six lines at most after the vertical NR process similar to the vertical resolution conversion portion 303 shown in FIG. 22, the number of the vertical NR filter portion is six.

Hereinafter, the vertical NR filter portion for the filter application pixel "y" of the pixel value Y(y) will be described. Similar explanation for other vertical NR filter portions is omitted.

FIG. 10 shows numbers of filter taps, filter factors and threshold levels of three vertical NR filters FH1-FH3 that are used and switched in the vertical NR process portion 54. The vertical NR filter FH1 has the number of filter taps FH1tap= [3], the filter factor [3,2,3], and the threshold level TH1=[8]. The vertical NR filter FH2 has the number of filter taps FH2tap=[3], the filter factor [2,4,2], and the threshold level TH2=[16]. The vertical NR filter FH3 has the number of filter taps FH3tap=[3], the filter factor [1,6,1], and the threshold level TH3=[32].

Figure 11:
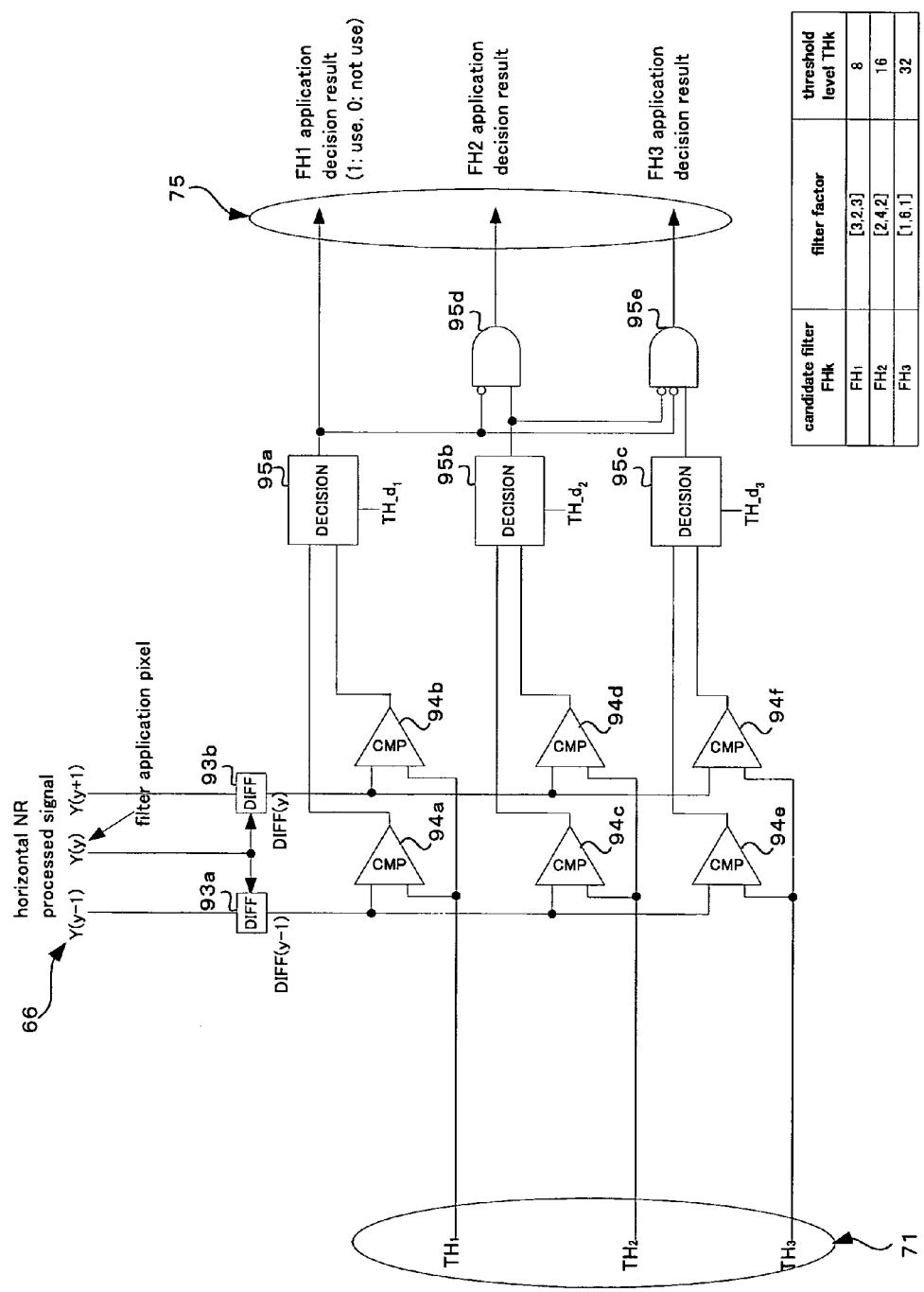
FIG. 11 shows a hardware structure of a condition decision portion in the second embodiment.

FIG. 11 shows a hardware structure of the condition decision portion 57. The condition decision portion 57 receives the horizontal NR processed signal 66 that is stored by line position as a first input and the set threshold level 71 (TH1-TH3) as a second input, selects the vertical NR filters FH1-FH3 that are used for the horizontal NR processed signal 66, and delivers the selection result 75. The horizontal NR processed signal 66 stored by line position and which is the first input includes three pixel values Y(y−1) to Y(y+1) stored in three line memories (not shown) at the same position in the horizontal direction.

The condition decision portion 57 includes computing elements 93a and 93b for calculating the image characterizing quantity defined by the equation F31, comparators 94a-94f for realizing the comparison function CMPk(x) defined by the equation F32, decision elements 95a-95c for realizing the filter application condition F30, and AND gates 95d and 95e for selecting one vertical NR filter that is used for the filtering process from vertical NR filters FHk that satisfy the filter application condition F30.

Each of the computing elements 93a and 93b calculates the image characterizing quantity from the pixels "y−1" and "y+1" that are adjacent to the filter application pixel "y" in the vertical direction. Namely, the computing elements 93a and 93b calculate the image characterizing quantities DIFF(y−1) and DIFF(y) defined by the equation F31 for the pixel values Y(y−1) to Y(y+1), respectively.

Each of comparators 94a and 94b receives one of the image characterizing quantities DIFF(y−1) and DIFF(y) as a first input and the threshold level TH1 of the vertical NR filter FH1 as a second input so as to produce one of the comparison results. Namely, each of the comparators 94a and 94b compares one of the image characterizing quantities DIFF(y−1) and DIFF(y) with the threshold level TH1 of the vertical NR filter FH1 so as to deliver the comparison result to the decision element 95a. Each of comparators 94c and 94d receives one of the image characterizing quantities DIFF(y−1) and DIFF (y) as a first input and the threshold level TH2 of the vertical NR filter FH2 as a second input so as to produce one of the comparison results. Namely, each of the comparators 94c and 94d compares one of the image characterizing quantities DIFF(y−1) and DIFF(y) with the threshold level TH2 of the vertical NR filter FH2 so as to deliver the comparison result to the decision element 95b. Each of comparators 94e and 94f receives one of the image characterizing quantities DIFF(y−1) and DIFF(y) as a first input and the threshold level TH3 of the vertical NR filter FH3 as a second input so as to produce one of the comparison results. Namely, each of the comparators 94e and 94f compares one of the image characterizing quantities DIFF(y−1) and DIFF(y) with the threshold level TH3 of the vertical NR filter FH3 so as to deliver the comparison result to the decision element 95c.

The decision element 95a receives outputs of the comparators 94a and 94b and the threshold level TH_d1 for these outputs so as to calculate the filter application condition F30. More specifically, if the pixels "y−1", "y" and "y+1" are decided to be in a flat region (smooth region) for example, the value [1] is delivered so as to indicate that the vertical NR filter FH1 satisfies the filter application condition F30. The decision element 95b receives outputs of the comparators 94c and 94d and the threshold level TH_d2 for these outputs so as to calculate the filter application condition F30. More specifically, if the pixels "y−1", "y" and "y+1" are decided to be in a flat region (smooth region) for example, the value [1] is delivered so as to indicate that the vertical NR filter FH2 satisfies the filter application condition F30. The decision element 95c receives outputs of the comparators 94e and 94f and the threshold level TH_d3 for these outputs so as to calculate the filter application condition F30. More specifically, if the pixels "y−1", "y" and "y+1" are decided to be in a flat region (smooth region) for example, the value [1] is delivered so as to indicate that the vertical NR filter FH3 satisfies the filter application condition F30.

Here, the output of the decision element 95a is delivered as the selection result 75 to the vertical NR process execution portion 58. Namely, if the output of the decision element 95a indicates the value [1], it means that the vertical NR filter FH1 is used for the filter application pixel "y". The output of the decision element 95b is received by the AND gate 95d. The AND gate 95d receives negation of the output value of the decision element 95a as a first input and the output value of the decision element 95b as a second input so as to deliver the selection result 75. Namely, if the output of the decision element 95a indicates the value [0] and the output of the decision element 95b indicates the value [1], the AND gate 95d delivers the value [1] so as to indicate that the vertical NR filter FH2 is used for the filter application pixel "y". The output of the decision element 95c is received by the AND gate 95e. The AND gate 95e receives negation of the output value of the decision element 95a as a first input, negation of the output value of the decision element 95b as a second input and the output value of the decision element 95c as a third input so as to deliver the selection result 75. Namely, if the outputs of the decision elements 95a and 95b indicate the value [0] and the output of the decision element 95c indicates the value [1], the AND gate 95e delivers the value [1] so as to indicate that the vertical NR filter FH3 is used for the filter application pixel "y". In this way, the selection result 75 is delivered as a value that indicates whether each of the vertical NR filters FH1-FH3 is used or not.

Figure 12:
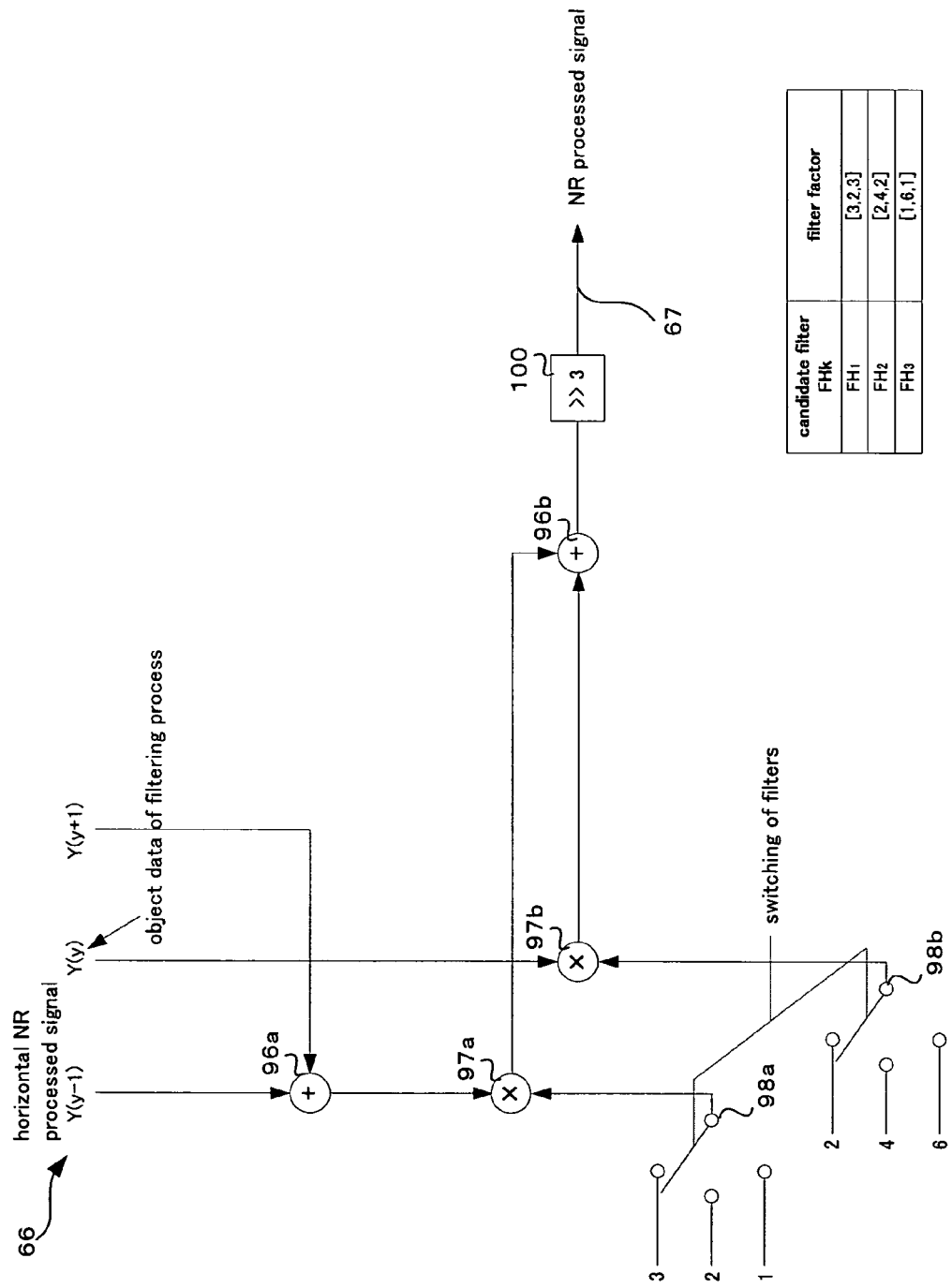
FIG. 12 shows a hardware structure of a vertical NR process execution portion in the second embodiment.

FIG. 12 shows a hardware structure of the vertical NR process execution portion 58. The vertical NR process execution portion 58 receives the pixel values Y(y−1) to Y(y+1) at the same position in the horizontal direction stored in three line memories as a first input and the selection result 75 as a second input so as to produce the NR processed signal 67 (pixel value Y'(y)) that is obtained by the vertical NR process on the filter application pixel "y" of the pixel value Y(y) corresponding to the selection result 75. The vertical NR process execution portion 58 includes adders 96a and 96b for performing adding operation of signals, multipliers 97a and 97b for performing multiplying operation of the filter factors, switches 98a and 98b for designating the filter factors, and a divider 100 for performing dividing operation of the horizontal NR processed signal 66 that is multiplied by the filter factor.

The adder 96a performs adding operation of pixel values having the same filter factor that are multiplied even if any one of the vertical NR filters FH1-FH3 is used. The adder 96a adds the pixel value Y(y−1) and the pixel value Y(y+1).

The multipliers 97a and 97b multiply respectively the outputs of the adder 96a and the pixel value Y(y) of the filter application pixel "y" by the filter factor of the vertical NR filter indicated by the selection result 75 of the condition decision portion 57. The multiplier 97a receives the output of the adder 96a as a first input and the output of the switch 98a as a second input so as to multiply these inputs. The multiplier 97b receives the pixel value Y(y) of the filter application pixel "y" as a first input and the output of the switch 98b as a second input so as to multiply these inputs.

The switches 98a and 98b operate in response to the selection result 75 of the condition decision portion 57, and the operation of the switch designates the filter factor that is multiplied to the output of the adder 96a and to the pixel value Y(y). The switches 98a and 98b designate the upper filter factor if the vertical NR filter FH1 is used, designate the middle filter factor if the vertical NR filter FH2 is used, and designate the lower filter factor if the vertical NR filter FH3 is used.

The adder 96b adds the outputs of the multipliers 97a and 97b. The adding result is divided by the sum of filter factors in the divider 100. Here, the sum of filter factors is set to be the value [8] if any one of the vertical NR filters FH1-FH3 is selected. Therefore, the divider 100 can perform the dividing operation by shifting operation of three bits. The dividing result of the divider 100 is delivered as the NR processed signal 67.

(Filtering Method)

Figure 13:
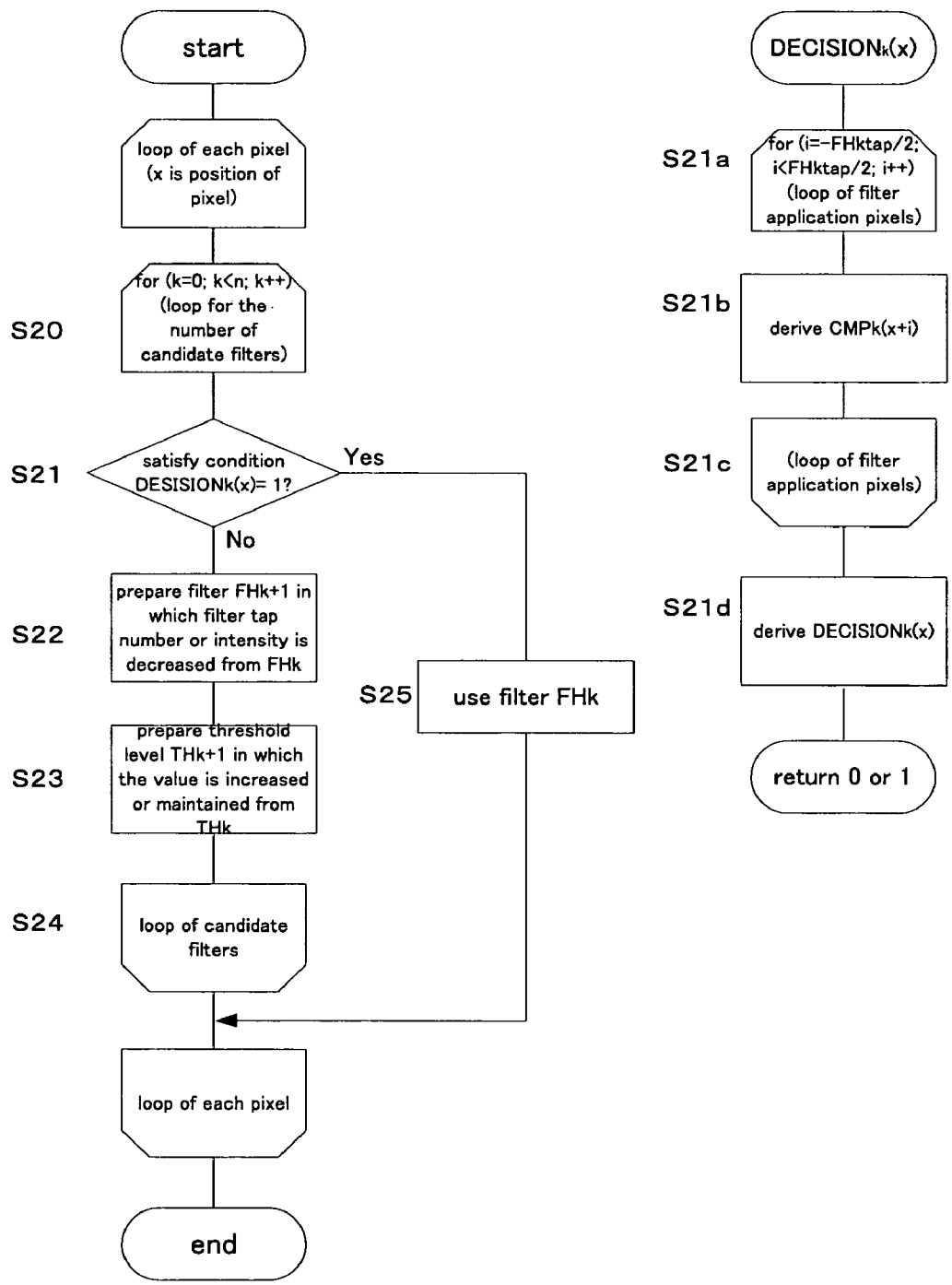
FIG. 13 is a flowchart of a filtering method in the second embodiment.

FIG. 13 shows a flowchart of a filtering method in the filter device 50, particularly a filtering method in the horizontal NR process portion 53 and the vertical NR process portion 54.

This filtering method is a process that is performed for each pixel of the decoded image signal 65 received by the horizontal NR process portion 53 or each pixel received by the vertical NR process portion 54 from line memories (not shown) (steps S20-S25). Hereinafter, a filtering method in the horizontal NR process portion 53 will be described. Note that the process in the following description is the same in the vertical NR process portion 54.

The condition decision portion 55 sequentially decides whether or not a value of the filter application condition F30 is [1] with regard to the horizontal NR filters FH1-FH3 (step S21). The decision whether or not the value of the filter application condition F30 is [1] is performed by the process for each of the filter reference pixels (steps S21a-S21d). A value of DIFF(x+i) defined by the equation F31 is calculated with regard to "i" that is more than or equal to (−FHktap/2) and less than (FHktap/2), and DIFF(x+i) is compared with THk ("k" is the number of the candidate filter that is an object in step S20) (step S21b). Furthermore, using the comparison result, the filter application condition defined by the equation F30 is calculated (step S21d). If the return value [1] is produced, the filter FHk is used for the filter application pixel "x" (step S25), and the next process is started for the next filter application pixel. On the other hand, if the return value [0] is produced, a next candidate filter FHk+1 is prepared (steps S22 and S23), and a similar process is performed (step S21). In addition, if the value of the filter application condition F30 is not [1] for each of the candidate filters, the horizontal NR filters FH1-FH3 are not used, and the next process for the next filter application pixel is started.

The filtering method described above can be realized by a program using a computer without being limited to the filter device 50.

(Effects of the Second Embodiment)

(1) One NR filter is selected for performing the NR process from the plurality of NR candidate filters in the filter device 50, so an appropriate NR effect can be obtained.

(2) It is possible to use a common method for calculating the image characterizing quantity when selecting one NR filter from the plurality of NR candidate filters. For example, it is possible to commonly use the calculation results of the computing elements 81a-81f shown in FIG. 8 and the computing elements 93a and 93b shown in FIG. 11 for selecting the NR filters, so that hardware costs can be reduced and the simplification of the process can be realized.

(3) When selecting one NR filter from the plurality of NR candidate filters, pixels necessary for calculating the image characterizing quantity are the same as the pixels used by each of the plurality of NR filters. For example, pixel values Y(x+3) to Y(x−3) are necessary for calculating the image characterizing quantity by the condition decision portion 55, and pixel values Y(x+3) to Y(x−3) are used by the horizontal NR process execution portion 56. Therefore, it is possible to structure the delay elements 80a-80f and the delay elements 85a-85f as common delay elements in FIGS. 8 and 9, so that hardware costs can be reduced and the simplification of the process can be realized.

In addition, pixel values Y(y−1) to Y(y+1) are necessary for the condition decision portion 57 and the vertical NR process execution portion 58. Therefore, line memories for obtaining these pixel values can be structured as common line memories, so that hardware costs can be reduced and the simplification of the process can be realized.

(4) In the filter device 50, a stronger filter may be used as flatness (smoothness) of the image is larger. Therefore, an appropriate NR effect can be obtained even if a contour of an object is included in the filter reference pixels.

(5) In the filter device 50, the sum of the filter factors of the NR filters will be the same value. Therefore, it is possible to use a common method for dividing the pixel values by the sum of the filter factors. In addition, it is possible to set the sum of the filter factors to [8] and to perform the dividing operation by shift operation of three bits. Therefore, the hardware structure can be simplified.

(6) In the filter device 50, as the filter intensity increases, the number of filter taps FHktap increases, and the threshold level THk of the filter application condition F30 decreases. Therefore, according to the filtering method and the filtering program in filter device 50, the structure of the software for using a filter having a higher NR effect with higher priority can be simplified.

(Modifications of the Second Embodiment)

The present invention is not limited to the above embodiment, and various modifications are possible within the spirit of the present invention.

(1) Effects of the present invention are not limited to the case of three horizontal and vertical NR candidate filters. The number of the NR candidate filters can be increased or decreased according to common knowledge by changing the number of elements of hardware shown in FIGS. 8, 9, 11 and 12.

(2) The NR candidate filter can be one having the number of filter taps FHktap that does not increase and the threshold level THk of the filter application condition F30 does not decrease as the filter intensity increases. Even in this case, it is possible to enhance the hardware structure of the filter device 50 shown as the second embodiment according to common knowledge.

(3) It is possible to use the vertical NR filter described above with reference to FIGS. 11 and 12 as the vertical NR filter portions 41-44 shown in FIG. 2. In this case, it is possible to obtain the decision result 33 from the vertical NR process decision portion 20 and to add a structure which delivers the pixel value of the filter application pixel in accordance with the obtained result (filter through).

(4) The condition decision portion 57 may be one that performs the condition decision by using the decoded image signal 65. In this case, the condition decision portion 57 can work in parallel with the horizontal NR process before the horizontal NR process is completed, so that the entire process speed of the filter device 50 can be improved.

THIRD EMBODIMENT

When selecting the NR filter and performing the filtering process, it is possible to change the threshold level that is used in the filter application condition F30 or to use a filter for the block boundary in accordance with whether or not the filter application pixel is located at the block boundary of the coded block. It is possible to realize this function in the horizontal NR process portion 13 and the vertical NR process portion 14 shown in FIG. 1 and the horizontal NR process portion 53 and the vertical NR process portion 54 shown in FIG. 5.

The horizontal NR process portion as a modified example of the horizontal NR process portion 53 (see FIG. 5) will be described with reference to FIGS. 14-16. In the horizontal NR process portion as a modified example, selection of the NR filter and execution of the NR process are performed for the decoded image signal 65 that is sequentially input by pixel position.

FIG. 14 shows numbers of filter taps and filter factors of three horizontal NR filters FH1-FH3 that are used with being switched in the horizontal NR process portion. The horizontal NR filter FH1 has the number of filter taps FH1tap=[5] and the filter factor [1, 2, 2, 2, 1]. The horizontal NR filter FH1 is used only when the filter application pixel is a pixel that is adjacent to the block boundary. The horizontal NR filter FH2 has the number of filter taps FH2tap=[5] and the filter factor [1, 1, 4, 1, 1]. The horizontal NR filter FH2 is used regardless of whether or not the filter application pixel is a pixel that is adjacent to the block boundary. The horizontal NR filter FH3 has the number of filter taps FH3tap=[3] and the filter factor [2,4,2]. The horizontal NR filter FH3 is used only when the filter application pixel is not a pixel that is adjacent to the block boundary.

Figure 15:
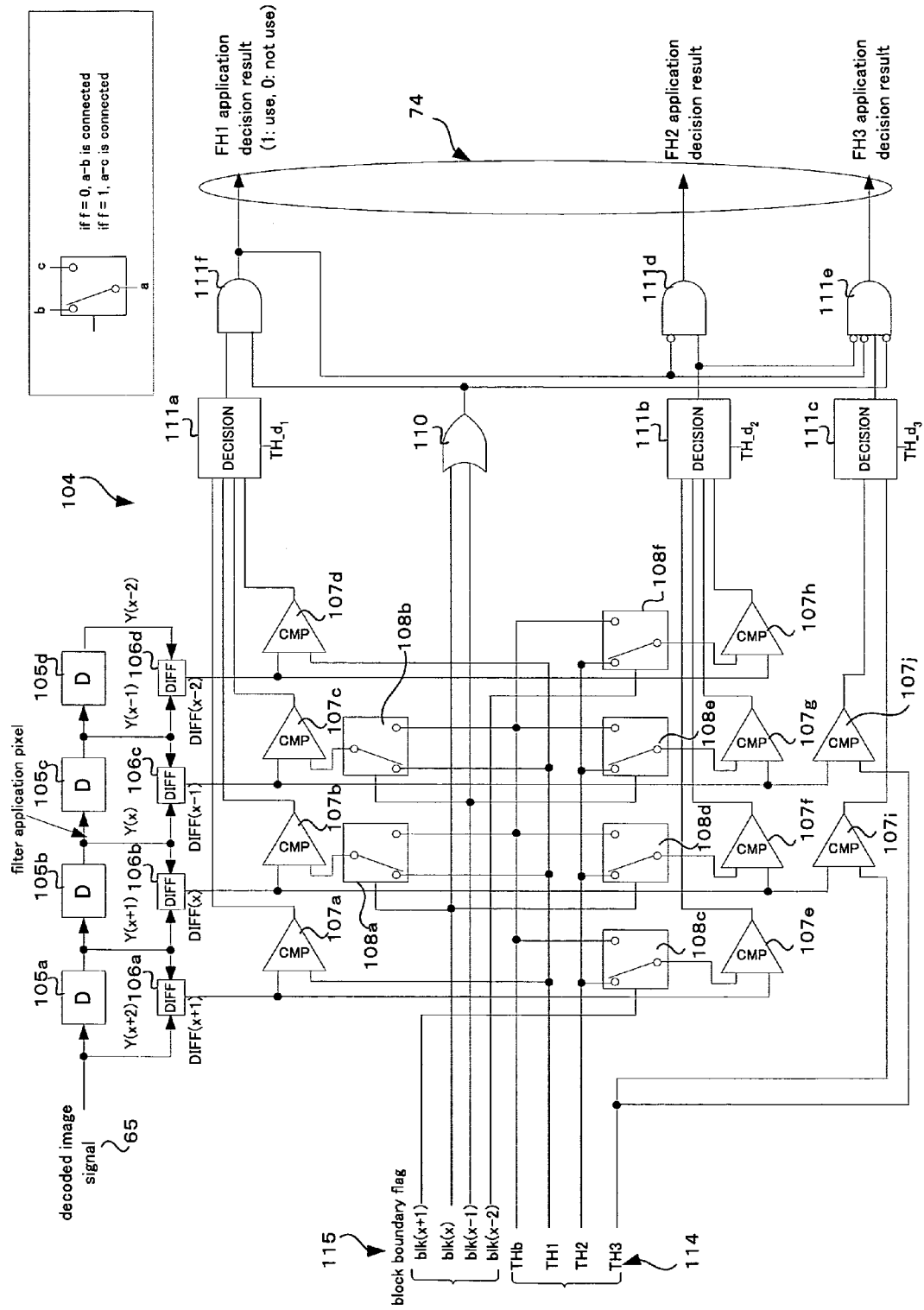
FIG. 15 shows a hardware structure of a condition decision portion in the third embodiment.

FIG. 15 shows a hardware structure of a condition decision portion 104 as a modified example of the condition decision portion 55. The condition decision portion 104 receives the decoded image signal 65 as a first input, a set threshold level 114 (TH1-TH3, THb) as a second input, and a block boundary flag 115 indicating that there is a block boundary between the pixel "x−2" and the pixel "x+2" (blk(x−2) to blk(x+1): blk(x) is a function that produces the value [1] if the block boundary exists between the pixel "x" and the pixel "x+1") as a third input, selects the horizontal NR filters FH1-FH3 that are used for the decoded image signal 65, and produces the selection result 74. Here, the block boundary flag 115 is information that is obtained by deciding whether or not the pixel is on the block boundary in accordance with address information of the pixel. The address information of a pixel is supplied by supplying means such as a decoding device for decoding the decoded image signal 65.

The condition decision portion 104 includes delay elements 105a-105d of one pixel delay, computing elements 106a-106d for calculating the image characterizing quantity in accordance with pixel values of neighboring pixels, comparators 107a-107j for realizing the comparison function CMPk(x) defined by the equation F32, switches 108a-108f for switching reference values to be given to the comparators 107b, 107c, 107e-107h in accordance with the value of the block boundary flag 115, an OR gate 110, decision elements 111a-111c for realizing the filter application condition F30 and AND gates 111d-111f.

The delay elements 105a-105d are connected to the decoded image signal 65 in series for one pixel delay, and produce pixel values Y(x+1) to Y(x−2) of the past four pixels from the pixel value Y(x+2) received as the decoded image signal 65.

Each of the computing elements 106a-106d calculates the image characterizing quantity from the input and the output of each of the delay elements 105a-105d. Namely, the computing elements 106a-106d calculate the image characterizing quantities DIFF(x+1) to DIFF(x−2) defined by the equation F31 (see FIG. 6) for the pixel values Y(x+2) to Y(x−2), respectively.

Each of comparators 107a and 107d receives one of the image characterizing quantities DIFF(x+1) and DIFF(x−2) as a first input and the threshold level TH1 of the horizontal NR filter FH1 as a second input so as to produce one of the comparison results. Namely, each of the comparators 107a and 107d compares one of the image characterizing quantities DIFF(x+1) and DIFF(x−2) with the threshold level TH1 of the horizontal NR filter FH1 so as to deliver the comparison result to the decision element 111a. Each of comparators 107b and 107c receives one of image characterizing quantities DIFF(x) and DIFF(x−1) as a first input and one of outputs of switches 108a and 108b as a second input so as to produce one of the comparison results. Namely, the comparators 107b and 107c compare the image characterizing quantities DIFF(x) and DIFF(x−1) with the outputs of switches 108a and 108b respectively so as to deliver the comparison result to the decision element 111a.

Each of comparators 107e-107h receives one of the image characterizing quantities DIFF(x+1) to DIFF(x−2) as a first input and one of outputs of switches 108c-108f as a second input so as to produce one of the comparison results. Namely, the comparators 107e-107h compare the image characterizing quantities DIFF(x+1) to DIFF(x−2) with the outputs of the switches 108c-108f respectively so as to deliver the comparison result to the decision element 111b.

Each of comparators 107i and 107j receives one of the image characterizing quantities DIFF(x) and DIFF(x−1) as a first input and the threshold level TH3 of the horizontal NR filter FH3 as a second input so as to produce one of the comparison results. Namely, the comparators 107i and 107j compare the image characterizing quantities DIFF(x) and DIFF(x−1) with the threshold level TH3 of the horizontal NR filter FH3 so as to deliver the comparison result to the decision element 111c.

Each of the switches 108a and 108b receives blk(x) or blk(x−1) of the block boundary flag 115 as a first input, the threshold level TH1 of the horizontal NR filter FH1 as a second input and a threshold level THb for the block boundary as a third input so as to produce the threshold level TH1 if blk(x) or blk(x−1) is the value [0] and to produce the threshold level THb for the block boundary if blk(x) or blk(x−1) is the value [1]. Each of the switches 108c-108f receives one of the (blk(x+1) to blk(x−2)) of the block boundary flag 115 as a first input, the threshold level TH2 of the horizontal NR filter FH2 as a second input, and the threshold level THb for the block boundary as a third input so as to produce the threshold level TH2 if the first input is the value [0] and to produce the threshold level THb for the block boundary if the first input is value [1].

The OR gate 110 receives blk(x) of the block boundary flag 115 as a first input and blk(x−1) of the same as a second input. Namely, the OR gate 110 produces the value [1] if the block boundary is adjacent to the filter application pixel "x". The output of the OR gate 110 is received by the AND gate 111f. In addition, the negation of the output of the OR gate 110 is received by the AND gate 111e.

The decision element 111a receives the outputs of the comparators 107a-107d and the threshold level TH_d1 for these output values. More specifically, if the pixels "x+2" to "x−2" are decided to be in a flat region (smooth region) for example, the value [1] is produced so as to indicate that the horizontal NR filter FH1 satisfies the filter application condition. Here, the filter application condition is substantially the same as the filter application condition F30 shown in FIG. 6, and the threshold level TH1 and the threshold level THb for the block boundary are switched to be used as the reference value of the comparison function CMPk(x) in the filter application condition F30.

The decision element 111b receives the outputs of comparators 107e-107h and the threshold level TH_d2 for these output values. More specifically, if the pixels "x+2" to "x−2" are decided to be in a flat region (smooth region) for example, the value [1] is produced so as to indicate that the horizontal NR filter FH2 satisfies the filter application condition. Here, the filter application condition is substantially the same as the filter application condition F30 shown in FIG. 6, and the threshold level TH2 and the threshold level THb for the block boundary are switched to be used as the reference value of the comparison function CMPk(x) in the filter application condition F30.

The decision element 111c receives the outputs of comparators 107i and 107j and the threshold level TH_d3 for these output values. More specifically, if the pixels "x+1" to "x−1" are decided to be in a flat region (smooth region) for example, the value [1] is produced so as to indicate that the horizontal NR filter FH3 satisfies the filter application condition.

Here, the output of the decision element 111a is received by the AND gate 111f. The AND gate 111f receives the output value of the decision element 111a as a first input and the output value of the OR gate 110 as a second input so as to produce the selection result 74. Namely, if the output of the decision element 111a indicates the value [1] and the output of the OR gate 110 indicates the value [1], the AND gate 111f produces the value [1] so as to indicate that the horizontal NR filter FH1 is used for the filter application pixel "x".

The output of the decision element 111b is received by the AND gate 11d. The AND gate 111d receives negation of the output value of the AND gate 111f as a first input and the output value of the decision element 111b as a second input so as to produce the selection result 74. Namely, if the output of the AND gate 111f indicates the value [0] and the output of the decision element 111b indicates the value [1], the AND gate 111d produces the value [1] so as to indicate that the horizontal NR filter FH2 is used for the filter application pixel "x".

The output of the decision element 111c is received by the AND gate 111e. AND gate 111e receives negation of output value of the AND gate 111f as a first input, negation of the output value of the decision element 111b as a second input, the output value of the decision element 111c as a third input and negation of the output value of the OR gate 110 as a fourth input so as to produce the selection result 74. Namely, if the outputs of the AND gate 111f and the decision elements 111b indicate the value [0] and the output of the decision element 111c indicates the value [1] and the output of the OR gate 110 indicates the value [0], the AND gate 111e produces the value [1] so as to indicate that the horizontal NR filter FH3 is used for the filter application pixel "x". As described above, the selection result 74 produces the value that indicates whether each of the horizontal NR filters FH1-FH3 is used or not.

The selection result 74 is received by a horizontal NR process execution portion (not shown) as a modified example of the horizontal NR process execution portion 56. The horizontal NR process execution portion receives the decoded image signal 65 as a first input and the selection result 74 as a second input so as to produce the horizontal NR processed signal 66 that is obtained by the horizontal NR process on the decoded image signal 65 corresponding to the selection result 74. Here, a structure of the horizontal NR process execution portion is substantially the same as the horizontal NR process execution portion 56 shown in FIG. 9 except for the number of delay elements and the filter factor, so description thereof will be omitted.

(Filtering Method)

Figure 16:
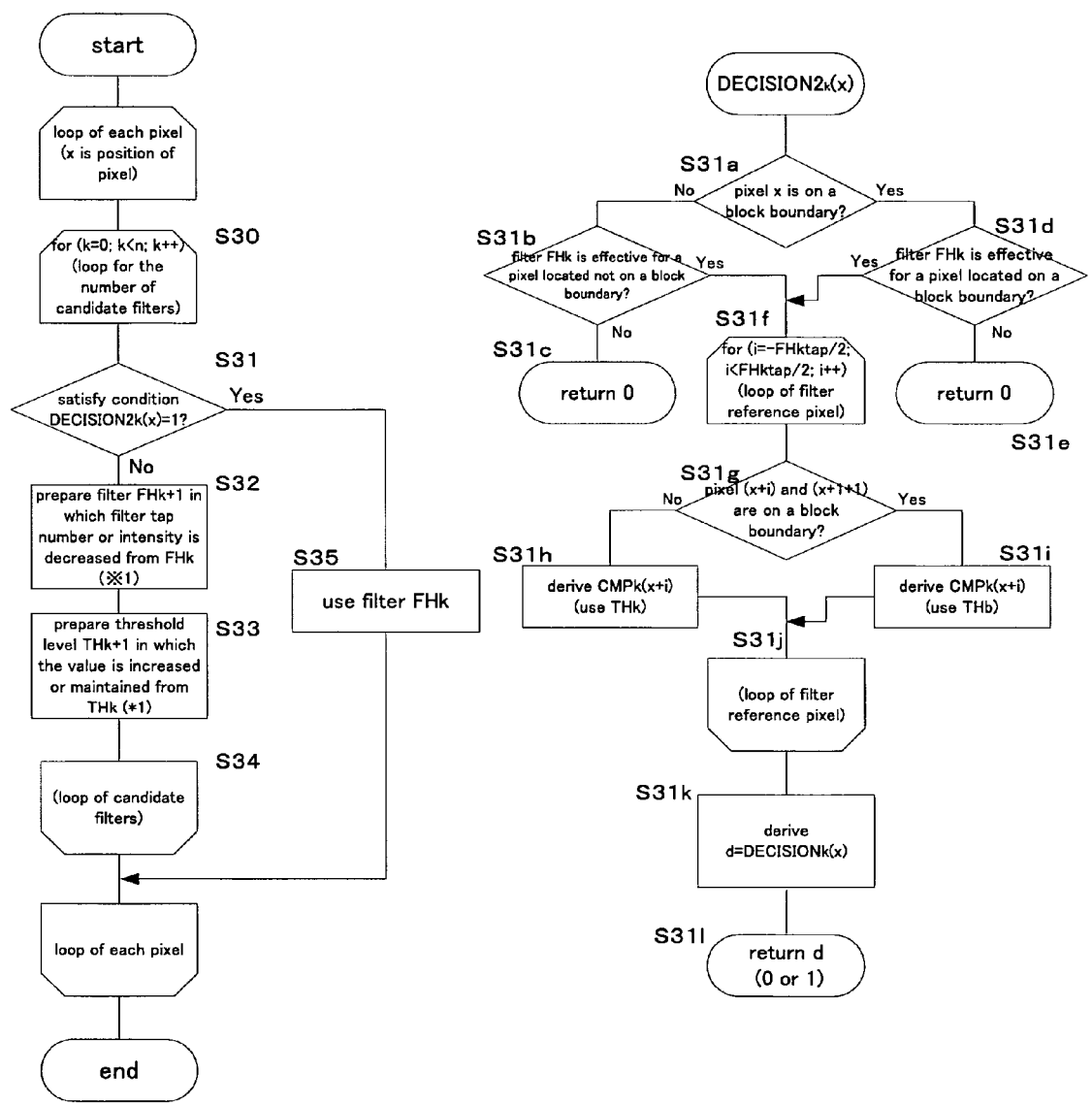
FIG. 16 is a flowchart of a filtering method in the third embodiment.

FIG. 16 shows a flowchart of a filtering method in the horizontal NR process portion as a modified example of the horizontal NR process portion 53.

This filtering method is a process that is performed on each pixel input in the horizontal NR process portion as the decoded image signal 65 (steps S30-S35). The condition decision portion 104 sequentially decides whether or not a value of the second filter application condition is [1] with regard to the horizontal NR filters FH1-FH3 (step S31).

Whether or not a value of the second filter application condition is [1] is decided in accordance with the process in steps S31a-S31l. First, it is decided whether the filter application pixel "x" is adjacent to the block boundary or not (step S31a).

If the filter application pixel "x" is not adjacent to the block boundary, it is decided whether or not the horizontal NR filter FHk is a horizontal NR filter that is used for a pixel that is not on the block boundary (for example, the horizontal NR filter FH2 or the FH3 in FIG. 14) (step S31b). If the horizontal NR filter FHk is a horizontal NR filter that is used only for a pixel on the block boundary (for example, the horizontal NR filter FH1 in FIG. 14), the return value [0] is produced (step S31c), and the process in steps S32-S34 is performed. On the other hand, if the horizontal NR filter FHk is a horizontal NR filter that is used for a pixel that is not located on the block boundary, the process in steps S31f-S31i for the filter reference pixel is performed.

If the filter application pixel "x" is a pixel on a block boundary (step S31a), it is decided whether or not the horizontal NR filter FHk is a horizontal NR filter that is used for a pixel that is not on the block boundary (step S31d). If the horizontal NR filter FHk is a horizontal NR filter that is used only for a pixel that is not on the block boundary, the return value [0] is produced (step S31e), and the process in steps S32-step S34 is performed. On the other hand, if the horizontal NR filter FHk is a horizontal NR filter that is used for a pixel on the block boundary, the process in steps S31f-S31l for the filter reference pixel is performed.

The condition decision portion 104 decides whether there is a block boundary or not between the pixel "x+i" (−FHktap/2≦i<FHktap/2) and the pixel "x+i+1" (step S31f).

If the decision result is negative, DIFF(x+i) defined by the equation F31 (see FIG. 6) is calculated, and DIFF(x+i) is compared with the threshold level THk ("k" is the number of the candidate filter that is an object in step S30) (step S31h).

If the decision result is positive, DIFF(x+i) defined by the equation F31 is calculated, and DIFF(x+i) is compared with the threshold level THb for the block boundary (step S31i). Furthermore, using the comparison result, the filter application condition defined by the equation F30 is calculated (step S31k).

If the return value [0] is produced (step S31l), the process in steps S32-S34 is performed. In steps S32-S34, the next candidate filter FHk+1 is prepared (steps S32 and S33), and the similar process is started (step S30).

If the return value [1] is produced (step S31l), the filter FHk is used for the filter application pixel "x" (step S35), the process for the next filter application pixel "x+1" is started.

The filtering method described above can be applied not only to the horizontal NR process portion as a modified example of the horizontal NR process portion 53 but also to the horizontal NR process portion 13 and the vertical NR process portion 14 shown in FIG. 1, and to the vertical NR process portion 54 shown in FIG. 5. In addition, it can be realized by a program using a computer.

(Effects of the Third Embodiment)

(1) It is possible to use an NR filter for a block boundary having stronger filter intensity for a pixel on the block boundary, for example, in the filter device having the horizontal NR process portion or the vertical NR process portion as described in the third embodiment. Thus, it is possible to further reduce block noise.

(2) By setting the threshold level THb to a value larger than the normal threshold levels TH1-TH3, it is possible to use the NR filters more for pixels on the block boundary. Thus, the block noise can be further reduced.

(3) In addition, by using an NR filter for a non-block boundary (for example, the horizontal NR filter FH3 in FIG. 14), the NR process can be performed using a more appropriate NR filter.

(4) In the condition decision portion 104 shown in FIG. 15, the image characterizing quantity that is calculated for deciding usage of the NR filter can be calculated more easily than a device for realizing the conventional filtering process shown in FIG. 25. Therefore, hardware costs can be reduced. In addition, with regard to a program that performs the same process by software, the process is easy and thus the process load can be reduced.

(Modifications of the Third Embodiment)

(1) In the horizontal NR filter shown in FIG. 14, the horizontal NR filter FH1 is used only for a filter application pixel that is adjacent to a block boundary. Here, the horizontal NR filter for the block boundary is not limited to when the filter application pixel is adjacent to the block boundary but may be used when it is close to the block boundary with one pixel between them. In addition, it is possible to switch filters in accordance with the number of pixels that exist between the filter application pixel and the block boundary. By using a filter having higher filter intensity at a vicinity of the block boundary, higher block noise can be reduced.

(2) Each of the candidate filters FH1-FH3 may use the threshold levels THb for the block boundary each of which has a different value.

FOURTH EMBODIMENT

As a fourth embodiment of the present invention, application examples of a filter device, a filtering method and filtering program, and a system using the same will be described with reference to FIGS. 17-20.

Figure 17:
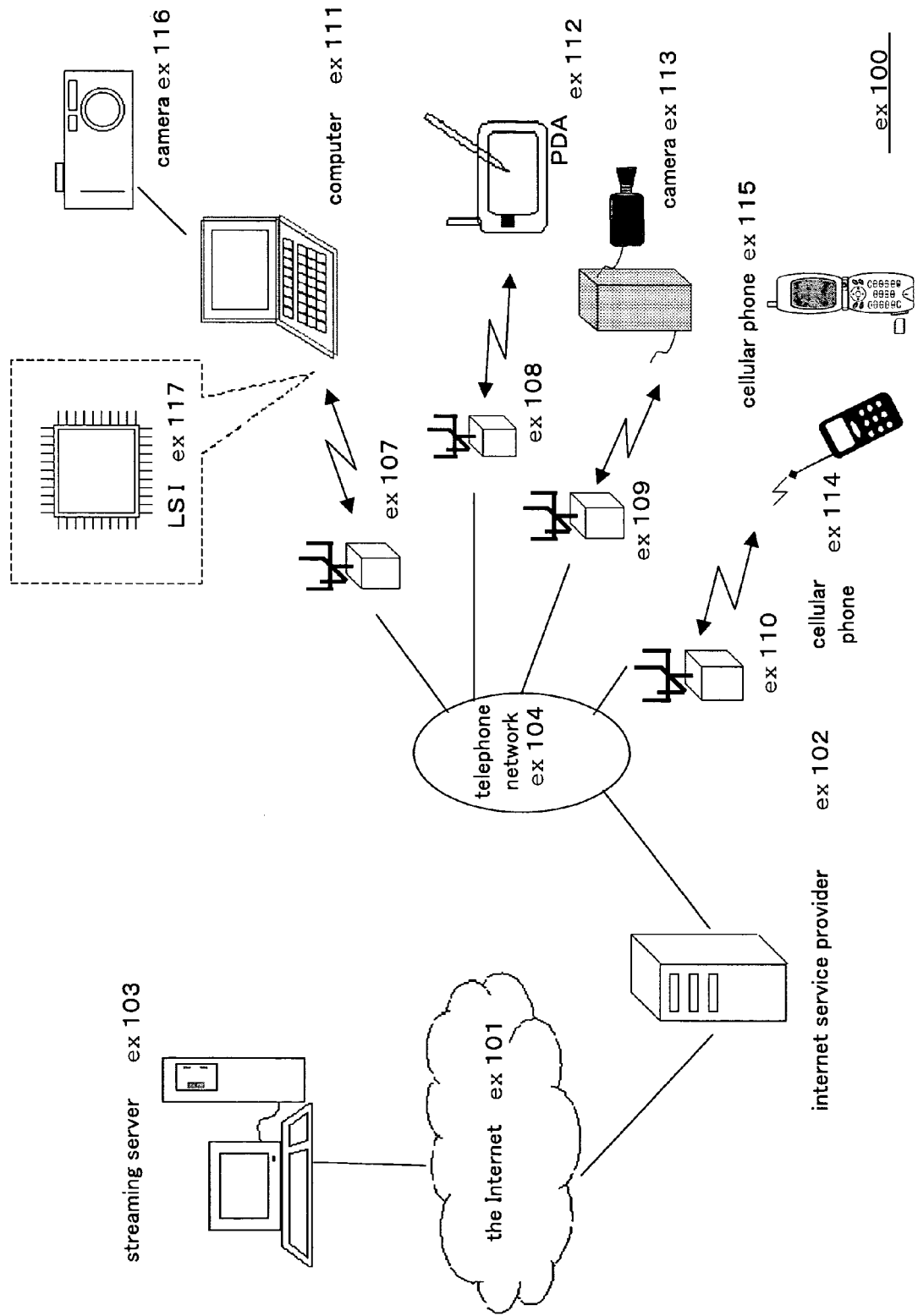
FIG. 17 is a block diagram of the overall structure of a content providing system in a fourth embodiment of the present invention.

FIG. 17 is a block diagram showing an overall structure of a content providing system ex100 that realizes a content delivering service. An area where a communication service is provided is divided into cells of a desired size, and base stations ex107-ex110 that are fixed radio stations are provided in the cells.

This content providing system ex100 includes a computer ex111, a personal digital assistant (PDA) ex112, a camera ex113, a cellular phone ex114, a cellular phone with camera ex115 and other equipment that are connected to the Internet ex101 for example via an internet service provider ex102, a telephone network ex104 and base stations ex107-ex110.

Figure 19:
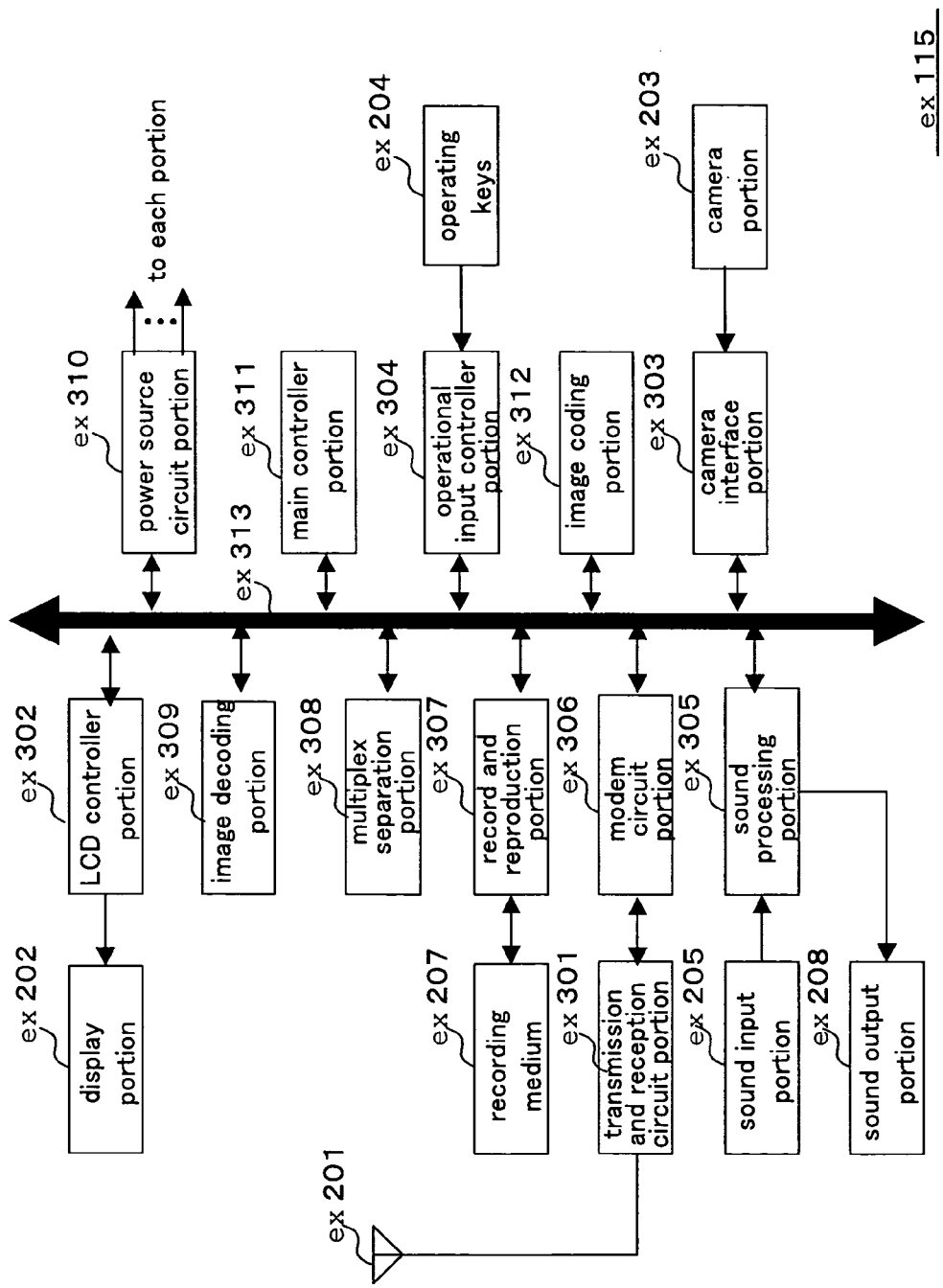
FIG. 19 is a block diagram of the cellular phone in the fourth embodiment.

However, the content providing system ex100 can adopt any combination for connection without being limited to the combination shown in FIG. 19. In addition, each of the devices can be connected directly to the telephone network ex104 without the base stations ex107-ex110 that are fixed radio stations.

The camera ex113 is a device such as a digital video camera that can obtain a moving image. In addition, the cellular phone may be any type of PDC (Personal Digital Communications) method, CDMA (Code Division Multiple Access) method, W-CDMA (Wideband-Code Division Multiple Access) method, or GSM (Global System for Mobile Communications) method, or a cellular phone of PHS (Personal Handyphone System).

In addition, the streaming server ex103 is connected to the camera ex113 via the base station ex109 and the telephone network ex104, so that live delivery can be performed on the basis of coded data transmitted by a user of the camera ex113. The coding process of the obtained data may be performed by the camera ex113 or by a server for transmitting data. In addition, the moving image data obtained by the camera ex116 may be transmitted to the streaming server ex103 via the computer ex111. The camera ex116 is a device that can take a still image like a digital camera and a moving image. In this case, coding of the moving image data may be performed by the camera ex116 or by the computer ex111. In addition, the coding process may be performed by an LSI ex117 in the computer ex111 or the camera ex116. Note that it is possible to incorporate software for coding and decoding images into a storage medium (a CD-ROM, a flexible disk, a hard disk or the like) that is a recording medium readable by the computer ex111. Furthermore, the cellular phone with camera ex115 may transmit the moving image data. In this case, the moving image data is coded by the LSI in the cellular phone ex115.

In this content providing system ex100, content (for example, a moving image of a music concert) that the user is recording with the camera ex113 or the camera ex116 are coded and transmitted to the streaming server ex103, while the streaming server ex103 delivers a stream of the content data to a client who made a request. The client may be the computer ex111, the PDA ex112, the camera ex113, the cellular phone ex114 or the like that can decode the coded data. Thus, in the content providing system ex100, the client can receive and reproduce the coded data. The system can realize personal broadcasting when the client receives, decodes and reproduces the stream in real time. In addition, reproduction of content may be performed by using the filter device, the filtering method and the filtering program of the embodiment described above. For example, the computer ex111, the PDA ex112, the camera ex113 and the cellular phone ex114 may be equipped with the filter device and the filtering program described in the above embodiment.

The cellular phone will be exemplified for the following description.

Figure 18:
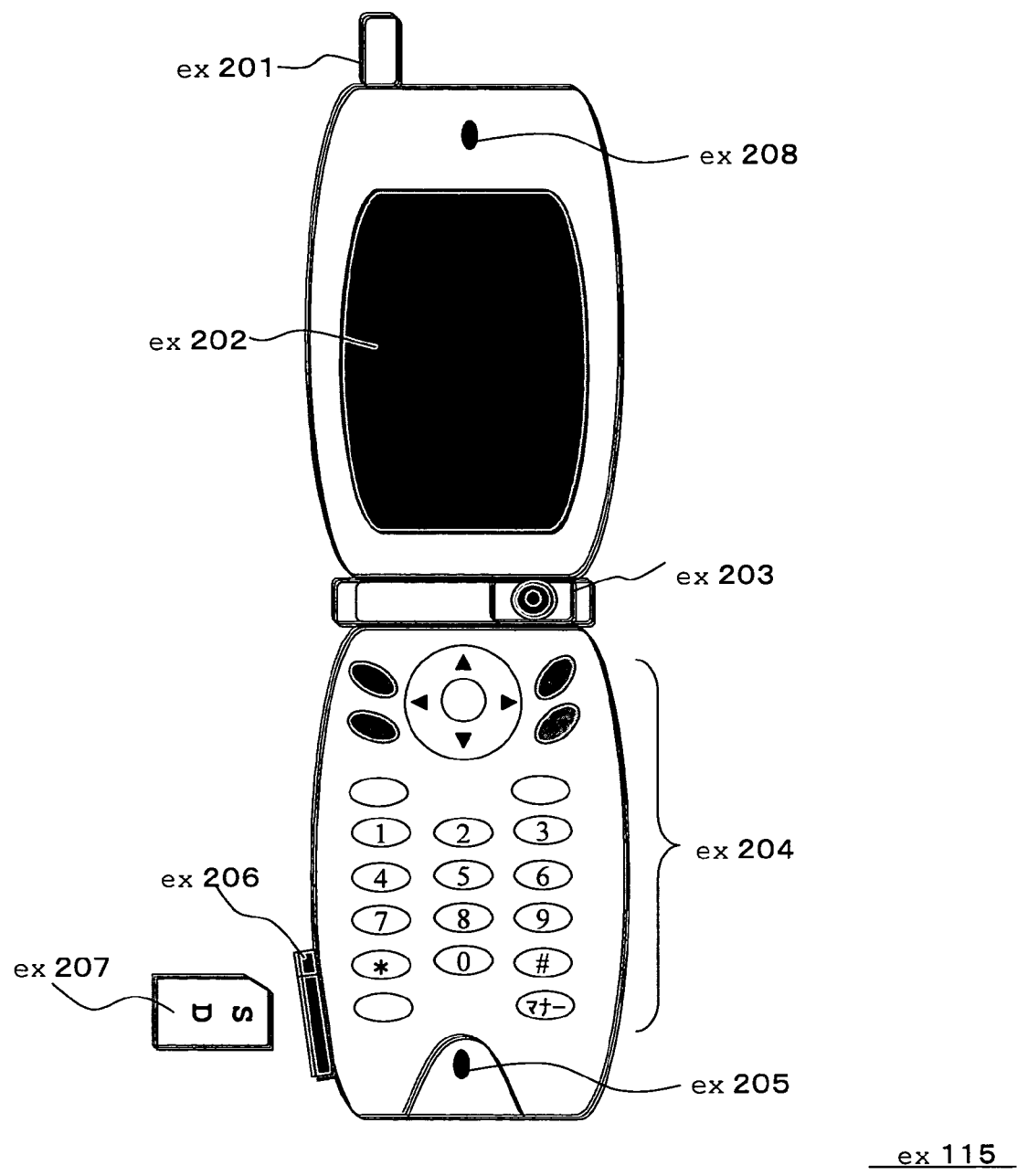
FIG. 18 shows an example of a cellular phone equipped with an interpolation frame generation device according to the present invention in the fourth embodiment.

FIG. 18 shows the cellular phone ex115 that utilizes a media data display device of the above embodiment. The cellular phone ex115 includes an antenna ex201 for transmitting and receiving radio waves with the base station ex110, a camera portion ex203 such as a CCD camera that can take a still image, a display portion ex202 such as a liquid crystal display for displaying images obtained by the camera portion ex203 or images received by the antenna ex201 after the image data are decoded, a main body portion including a group of operating keys ex204, a sound output portion ex208 such as a speaker for producing sounds, a sound input portion ex205 such as a microphone for receiving sounds, a recording medium ex207 for storing coded data or decoded data such as data of taken moving images or still images, data of received e-mails, moving images or still images, and a slot portion ex206 that enables the recording medium ex207 to be attached to the cellular phone ex115. The recording medium ex207 such as an SD card includes a plastic case housing a flash memory element that is one type of EEPROM (Electrically Erasable and Programmable Read Only Memory) non-volatile memory that is electronically rewritable and erasable.

Furthermore, the cellular phone ex115 will be described with reference to FIG. 19. The cellular phone ex115 includes a main controller portion ex311 for controlling each portion of the main body portion having the display portion ex202 and the operating keys ex204, a power source circuit portion ex310, an operational input controller portion ex304, an image coding portion ex312, a camera interface portion ex303, an LCD (Liquid Crystal Display) controller portion ex302, an image decoding portion ex309, a multiplex separation portion ex308, a record reproduction portion ex307, a modem circuit portion ex306 and a sound processing portion ex305, which are connected to each other via a synchronizing bus ex313.

When the user turns on a clear and power key, the power source circuit portion ex310 supplies power from a battery pack to each portion so that the digital cellular phone with camera ex115 is activated.

The cellular phone ex115 converts a sound signal collected by the sound input portion ex205 during a sound communication mode into digital sound data by the sound processing portion ex305 under control of the main controller portion ex311 that includes a CPU, a ROM and a RAM. The digital sound data are processed by the modem circuit portion ex306 as a spectrum spreading process and are processed by the transmission and reception circuit portion ex301 as a digital to analog conversion process and a frequency conversion process. After that, the data are transmitted via the antenna ex201. In addition, the cellular phone ex115 amplifies a signal that is received by the antenna ex201 during the sound communication mode and performs the frequency conversion process and an analog to digital conversion process on the data, which is processed by the modem circuit portion ex306 as a spectrum reverse spreading process and is converted into a analog sound signal by the sound processing portion ex305. After that, the analog sound signal is delivered by the sound output portion ex208.

Furthermore, when transmitting electronic mail during a data communication mode, text data of the electronic mail are entered by using the operating keys ex204 of the main body portion and are given to the main controller portion ex311 via the operational input controller portion ex304. The main controller portion ex311 performs the spectrum spreading process on the text data by the modem circuit portion ex306 and performs the digital to analog conversion process and the frequency conversion process by the transmission and reception circuit portion ex301. After that, the data are transmitted to the base station ex110 via the antenna ex201.

When transmitting image data during the data communication mode, the image data obtained by the camera portion ex203 are supplied to the image coding portion ex312 via the camera interface portion ex303. In addition, if the image data are not transmitted, it is possible to display the image data obtained by the camera portion ex203 directly by the display portion ex202 via the camera interface portion ex303 and an LCD controller portion ex302.

The image coding portion ex312 converts the image data supplied from the camera portion ex203 into the coded image data by compressing and coding the data, and the coded image data are supplied to the multiplex separation portion ex308. In addition, the cellular phone ex115 collects sounds by the sound input portion ex205 while the camera portion ex203 is taking the image, and the digital sound data is supplied from the sound processing portion ex305 to the multiplex separation portion ex308.

The multiplex separation portion ex308 performs multiplexing of the coded image data supplied from the image coding portion ex312 and the sound data supplied from the sound processing portion ex305 by a predetermined method. Multiplexed data obtained as a result are processed by the modem circuit portion ex306 as a spectrum spreading process and are processed by the transmission and reception circuit portion ex301 as a digital to analog conversion process and a frequency conversion process. After that, the data are transmitted via the antenna ex201.

When receiving moving image file data that are linked to a web page during the data communication mode, a signal received from the base station ex110 via the antenna ex201 is processed by the modem circuit portion ex306 as a spectrum reverse spreading process. Multiplexed data obtained as a result are supplied to the multiplex separation portion ex308.

In addition, in order to decode multiplexed data received via the antenna ex201, the multiplex separation portion ex308 separates a coded bit stream of image data in the multiplexed data from a coded bit stream of sound data. Then, the multiplex separation portion ex308 supplies the coded image data to the image decoding portion ex309 via the synchronizing bus ex313 and supplies the sound data to the sound processing portion ex305.

Next, the image decoding portion ex309 generates reproduction moving image data by decoding the coded bit stream of the image data and supplies the data to the display portion ex202 via the LCD controller portion ex302. Thus, the moving image data included in a moving image file that is linked to a home page can be displayed.

In addition, the image decoding portion ex309 may function as a filter device described in the above embodiment.

In this case, the sound processing portion ex305 converts the sound data into an analog sound signal, which is supplied to the sound output portion ex208. Thus, sound data included in the moving image file that is linked to a home page can be reproduced.

Figure 20:
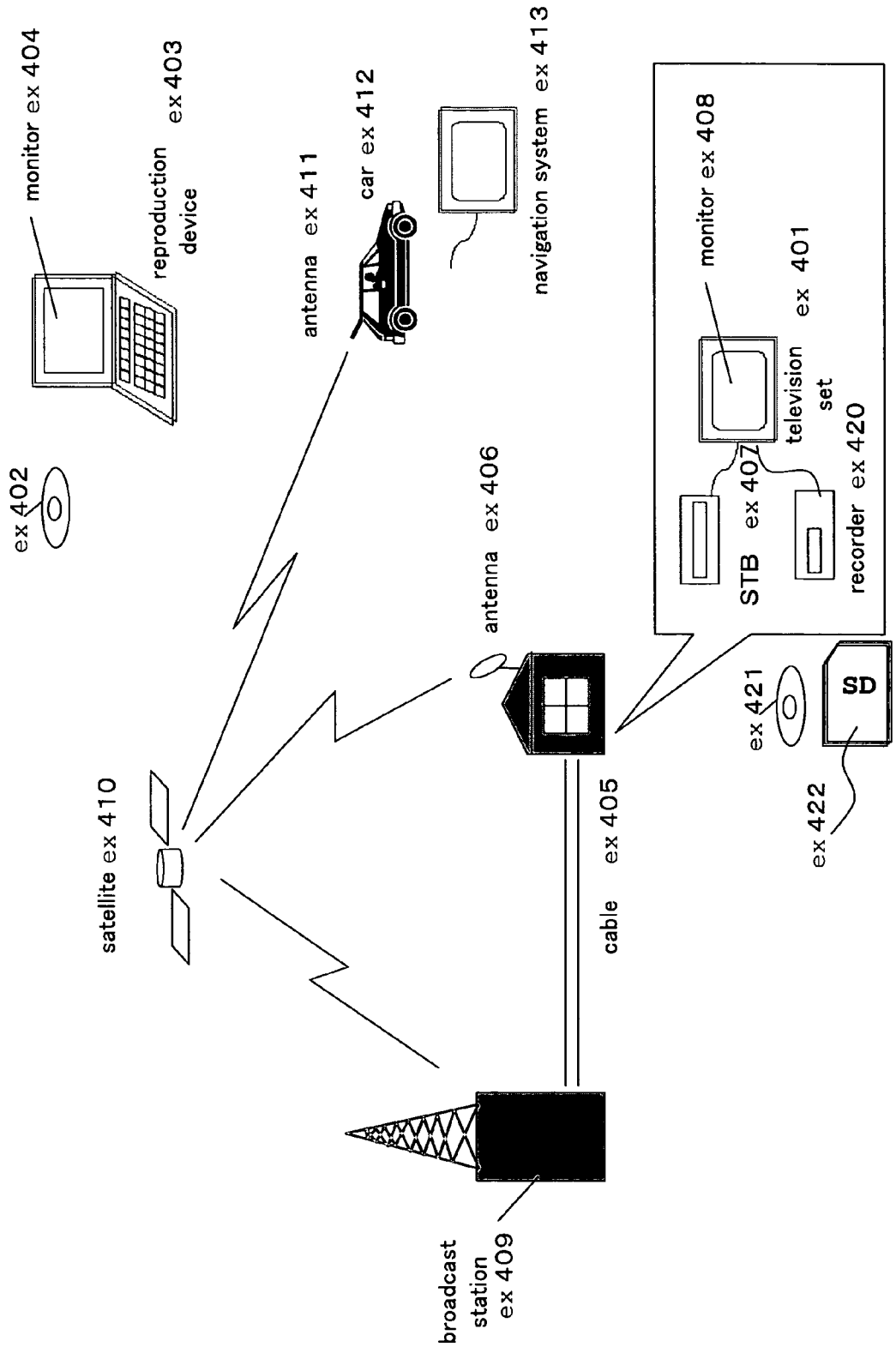
FIG. 20 shows an example of a digital broadcasting system in the fourth embodiment.
Figure 21:
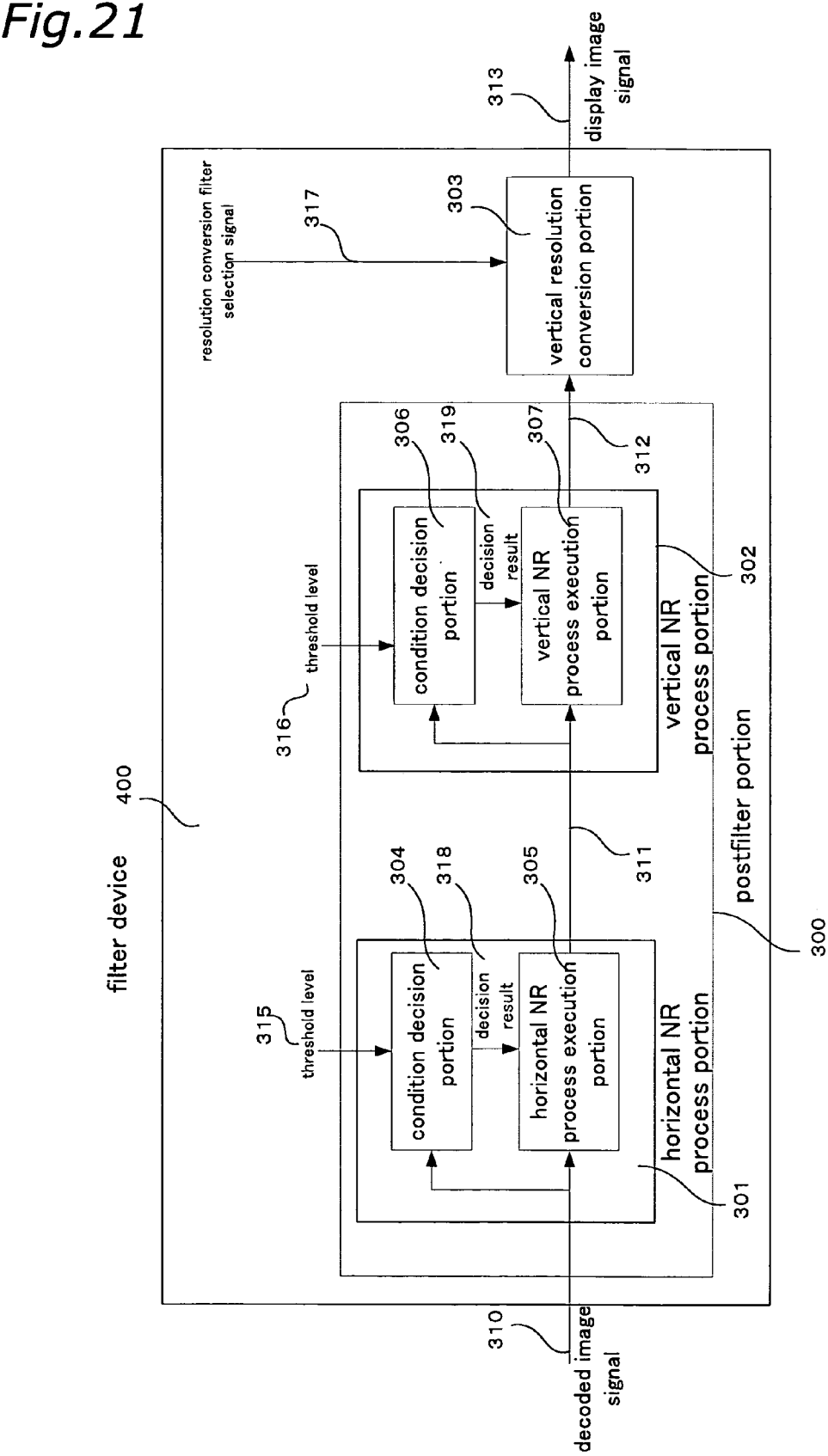
FIG. 21 is a block diagram of a filter device in the background art.

Note that the present invention is not limited to the example of the system described above. Digital broadcasting by satellite or terrestrial signals has been a recent topic of discussion. As shown in FIG. 20, the filter device, the filtering method and the filtering program of the above embodiment can be incorporated into the digital broadcasting system, too. More specifically, in a broadcast station ex409, a coded bit stream of image information is sent to a communication or a broadcasting satellite ex410 via a radio wave. The broadcasting satellite ex410 that received the coded bit stream of image information sends radio waves for broadcasting. These radio waves are received by an antenna ex406 of a house equipped with a satellite broadcasting reception facility, and a device such as a television set (a receiver) ex401 or a set top box (STB) ex407 decodes the coded bit stream and reproduces the same. Here, the television set (the receiver) ex401 or the set top box (STB) ex407 may be equipped with the filter device of the above embodiment. In addition, it may use the filtering method of the above embodiment. Furthermore, it may have the filtering program of the above embodiment. In addition, a reproduction device ex403 for reading and decoding a coded bit stream that is recorded on a storage medium ex402 such as a CD or a DVD that is a recording medium may be equipped with the filter device, the filtering method and the filtering program of the above embodiment. In this case, the reproduced image signal is displayed on a monitor ex404. In addition, it is possible to mount a filter device of the above embodiment in a set top box ex407 that is connected to a cable ex405 for a cable television or the antenna ex406 for a satellite or surface wave broadcasting, so that the image can be reproduced on a monitor ex408 of the television set. In this case, it is possible to incorporate the filter device not into the set top box but into the television set. In addition, it is possible that a car ex412 equipped with an antenna ex411 receives a signal from the broadcasting satellite ex410 or the base station ex107 and reproduces the moving image on a display of a navigation system ex413 in the car ex412.

Furthermore, it is possible to code the image signal, which is recorded in a recording medium. As a specific example, there is a recorder ex420 such as a DVD recorder for recording image signals on a DVD disk ex421 or a disk recorder for recording image signals on a hard disk. Furthermore, it is possible to record on an SD card ex422. In addition, it is possible to reproduce image signals recorded on a DVD disk ex421 or a SD card ex422 via a filter device of the above embodiment, so as to display on the monitor ex408.

Note that in the structure of the navigation system ex413 shown in FIG. 19, the camera portion ex203, the camera interface portion ex303 and the image coding portion ex312 can be omitted. This can be also applied to the computer ex111 and the television set (the receiver) ex401.

In addition, the terminal device such as the cellular phone ex114 may include three types of assemblies. A first type is a transmission and reception terminal having both the coder and the decoder, a second type is a transmission terminal having only a coder and a third type is a reception terminal having only a decoder.

Thus, the filter device, the filtering method and the filtering program of the above embodiment can be used for any device and system described above, so that effects described above can be obtained.

Note that each functional block in block diagrams (shown in FIGS. 1, 2, 5 and 19) and structures of hardware (FIGS. 8, 9, 11, 12 and 15) are typically realized as an LSI that is an integrated circuit. These may be integrated in a plurality of chips or a single chip. For example, functional blocks except the memory may be integrated in a single chip.

The LSI may be referred to as an IC, a system LSI, a super LSI or an ultra LSI in accordance with the degree of integration.

In addition, a method for integrating circuits is not limited to an LSI but it may be realized by an application specific integrated circuit or a versatile processing unit. It is possible to use an FPGA (Field Programmable Gate Array) that is programmable after the LSI is produced or a silicon figurable processor that can restructure connection or setting of circuit cells in the LSI.

Furthermore, if another technique for integrating circuits rather than he LSI appears with the progress of semiconductor technology, then that technique may be utilized for integrating the functional blocks. Biotechnology has the potential for such technology.

The filter device according to the present invention is useful as a filter device in which the reduction of hardware costs is desired, particularly as a filter device that utilizes noise reduction (NR) filters. In addition, the filtering method and the filtering program according to the present invention is useful as a filtering method and a filtering program that utilize NR filters in which the reduction of hardware costs or the reduction of the software process load is desired.

What is claimed is:

1. A filter device for performing a filter process on a plurality of proceed signals obtained by processing an input image signal that has been input, the filter device comprising:
    an NR process decision unit operable to determine a decision result value in accordance with a resolution conversion filter selection signal;
    an NR process unit having a plurality of NR filter units and operable to output at least one of the plurality of processed signals through a direct path, output a remainder of the plurality of processed signals through the plurality of NR filter units, the plurality of NR filter units being operable to determine whether or not to perform a filtering process in accordance with the decision result value, and output the at least one of the plurality of processed signals output the direct path and the remainder of the plural it of processed signals output through the plurality of NR filter units as NR processed signals; and
    a resolution conversion unit operable to convert resolution of the NR processed signals to generate a display image signal in accordance with the resolution conversion filter selection signal, and output the display image signal,
    wherein said NR process decision unit is operable to switch ON or OFF of the NR filter units in accordance with an operation of said resolution conversion unit, the operation of the resolution conversion being determined based on the resolution conversion filter selection signal;
    wherein if the resolution conversion filter selection signal indicates to convert resolution by using the plurality of processed signals corresponding to pixels less than the pixels to which the plurality of processed signals correspond, said NR process decision unit determines the decision result value to be a value indicating NR filter ON;
    wherein if the resolution conversion filter selection signal indicates to convert resolution by using the plurality of processed signals corresponding to pixels equal to the pixels to which the plurality of processed signals corresponds, said NR process decision unit determines the decision result value to be a value indicating NR filter OFF; and
    wherein if the resolution conversion filter selection signal indicates not to convert resolution, said NR process decision unit determines the decision result value to be a value indicating NR filter ON.

2. A filter device for performing a filter process on a plurality of processed signals obtained by processing an input image signal that has been input, the filter device comprising:
    an NR process decision unit operable to determine a decision result value in accordance with a resolution conversion filter selection signal:
    an NR process unit having a plurality of NR filter units and operable to output at least one of the plurality of processed signals through a direct path, output a remainder of the plurality of processed signals through the plurality of NR filter units, the plurality of NR filter units being operable to determine whether or not to perform a filtering process in accordance with the decision result value, and output the at least one of the plurality of processed signals output through the direct path and the remainder of the plurality of processed signals output through the plurality of NR filter units as NR processed signals; and a resolution conversion unit operable to convert resolution of the NR processed signals to generate a display image signal in accordance with the resolution conversion filter selection signal, and output the display image signal, wherein said NR process decision unit is operable to switch ON or OFF of the NR filter units in accordance wit an operation of said resolution conversion unit, the operation of the resolution conversion being determined based on the resolution conversion filter selection signal;

wherein said NR process unit includes a horizontal NR process unit and a vertical NR process unit, the horizontal NR process unit is operable to receive an input image signal, perform a horizontal NR process on the input image signal and output a plurality of horizontal NR processed signals, said NR process decision unit includes a vertical NR process decision unit operable to determine a decision result value in accordance with a resolution conversion filter selection signal;

wherein the vertical NR process unit has a plurality of vertical NR filter units and operable to output at least one of the plurality of horizontal NR processed signals through a direct path, output a remainder of the plurality of horizontal NR processed signals through the plurality of vertical NR filter units, the plurality of vertical NR units being operable to determine whether or not to perform a vertical filtering process in accordance with the decision result value, and output the at least one of the plurality of horizontal NR processed signals output through the direct path and the remainder of the plurality of horizontal NR processed signals output through the plurality of vertical NR filter units as NR processed signals;

wherein a vertical resolution conversion unit converts resolution of the NR processed signals to generate a display image signal in accordance with the resolution conversion filter selection signal, and outputs the display image signal;

wherein if vertical resolution conversion is not performed, the resolution conversion filter selection signal is set to indicate operation of no resolution conversion;

wherein if vertical resolution conversion is a conversion with a simple conversion ratio such as an integer or an inverse number of an integer, the resolution conversion filter selection signal is set to indicate operation of a middle M line input and one line output; and wherein if vertical resolution conversion is not a conversion with a simple conversion ratio such as an integer or an inverse number of an integer, the resolution conversion filter selection signal is set to indicate operation of line input and one line output, where the number of line input when vertical resolution conversion is a conversion with a simple conversion ratio is smaller than the number of line input when vertical resolution conversion is not a conversion with a simple conversion ratio.

* * * * *

UNITED STATES PATENT AND TRADEMARK OFFICE
CERTIFICATE OF CORRECTION

PATENT NO. : 7,636,493 B2 Page 1 of 1
APPLICATION NO. : 10/925991
DATED : December 22, 2009
INVENTOR(S) : Satoshi Sakaguchi et al.

It is certified that error appears in the above-identified patent and that said Letters Patent is hereby corrected as shown below:

In column 32, claim 1, line 16, "...of proceed signals obtained..." should read --...of processed signals obtained...--.

In column 32, claim 1, line 30, "plural it of processed signals..." should read --...plurality of processed signals...--.

In column 33, claim 2, line 14, "...in accordance wit an..." should read --...in accordance with an...--.

Signed and Sealed this

Thirteenth Day of April, 2010

David J. Kappos
*Director of the United States Patent and Trademark Office*